US012786969B2

(12) United States Patent
Ye et al.

(10) Patent No.: US 12,786,969 B2
(45) Date of Patent: Nov. 3, 2026

(54) ENHANCEMENT OF HANDLING INTRA-CELL GUARD BAND FOR SIDELINK (SL) IN UNLICENSED SPECTRUM

(71) Applicant: Apple Inc., Cupertino, CA (US)

(72) Inventors: Chunxuan Ye, San Diego, CA (US); Huaning Niu, San Jose, CA (US); Sigen Ye, San Diego, CA (US); Hong He, San Jose, CA (US); Oghenekome Oteri, San Diego, CA (US); Wei Zeng, Saratoga, CA (US); Dawei Zhang, Saratoga, CA (US); Ankit Bhamri, Munich (DE); Haitong Sun, Cupertino, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 339 days.

(21) Appl. No.: 18/480,771

(22) Filed: Oct. 4, 2023

(65) Prior Publication Data

US 2024/0155582 A1 May 9, 2024

Related U.S. Application Data

(60) Provisional application No. 63/422,503, filed on Nov. 4, 2022.

(51) Int. Cl.
*H04W 72/0453* (2023.01)
*H04W 72/25* (2023.01)

(52) U.S. Cl.
CPC ....... *H04W 72/0453* (2013.01); *H04W 72/25* (2023.01)

(58) Field of Classification Search
CPC ... H04W 72/0453; H04W 72/25; H04W 4/40; H04W 92/18; H04L 5/0041; H04L 5/0042; H04L 5/0055; H04L 5/0044
See application file for complete search history.

(56) References Cited

U.S. PATENT DOCUMENTS

| | | | | |
|---|---|---|---|---|
| 2023/0269730 A1* | 8/2023 | Sun | H04L 5/0053 370/329 |
| 2023/0319745 A1* | 10/2023 | Liu | H04W 72/1263 370/503 |
| 2024/0015716 A1* | 1/2024 | Cheng | H04L 27/0006 |
| 2024/0015746 A1* | 1/2024 | Khoshnevisan | H04L 5/001 |
| 2024/0023079 A1* | 1/2024 | Si | H04W 72/02 |
| 2024/0056898 A1* | 2/2024 | Liu | H04W 92/18 |

(Continued)

OTHER PUBLICATIONS

PCT Search Report dated Feb. 7, 2024 in connection with Application Serial No. PCT/US2023/034524.

(Continued)

*Primary Examiner* — Yu-Wen Chang
(74) *Attorney, Agent, or Firm* — Eschweiler & Potashnik, LLC; Matthew Glause

(57) ABSTRACT

A user equipment (UE) can operate in an unlicensed network for sidelink (SL) communications to generate SL transmission with multiple RB sets to include physical resource blocks (PRBs) in an intra-cell guard band between two adjacent RB sets that are associated with a first RB set or a second RB set. PRBs of the intra-cell guard band can belong to the first RB set with a lower frequency than the intra-cell guard band or belong to a second RB set with a higher frequency than the intra-cell guard band.

22 Claims, 13 Drawing Sheets

(56) References Cited

U.S. PATENT DOCUMENTS

| | | | | |
|---|---|---|---|---|
| 2025/0142597 A1* | 5/2025 | Zhao | ..................... | H04W 72/25 |
| 2025/0185046 A1* | 6/2025 | Park | .................. | H04W 74/0808 |
| 2026/0052551 A1* | 2/2026 | Ye | ......................... | H04L 5/0055 |

OTHER PUBLICATIONS

Huawei et al.; Physical channel design for sidelink operation over unlicensed spectrum; 3GPP TSG-RAN WG1 Meeting #110bis-e; R1-2208449; Oct. 10, 2022.
Qualcomm Incorporated; Physical Channel Design for Sidelink on Unlicensed Spectrum; 3GPP TSG-RAN WG1 #110-bis; R1-2209986; Oct. 10, 2022.
3rd Generation Partnership Project; Technical Specification Group Radio Access Network; NR; Physical layer procedures for data (Release 17); 3GPP TS 38.214 V17.3.0; Sep. 2022.
International Report on Patentability dated Apr. 29, 2025 in connection with Application No. PCT/US2023/03424.

* cited by examiner

ENHANCEMENT OF HANDLING INTRA-CELL GUARD BAND FOR SIDELINK (SL) IN UNLICENSED SPECTRUM

CROSS-REFERENCE TO RELATED APPLICATIONS

The application claims the benefit of U.S. Provisional Patent Application 63/422,503 filed Nov. 4, 2022, entitled “ENHANCEMENT OF HANDLING INTRA-CELL GUARD BAND FOR SIDELINK (SL) IN UNLICENSED SPECTRUM”, the contents of which are herein incorporated by reference in their entirety.

FIELD

The present disclosure relates to wireless technology including sidelink (SL) enhancement of handling intra-cell guard band in the unlicensed spectrum.

BACKGROUND

Mobile communication in the next generation wireless communication system, 5G, or new radio (NR) network provides ubiquitous connectivity and access to information, as well as ability to share data, around the globe. 5G networks and network slicing is a unified, service-based framework that will target to meet versatile and sometimes, conflicting performance criteria to provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions. Another type of mobile communication includes vehicle communication, where vehicles communicate or exchange vehicle related information. The vehicle communication can include vehicle to everything (V2X) devices or a V2X user equipment (UE), which includes vehicle to vehicle (V2V), vehicle to infrastructure (V2I) and vehicle to pedestrian (V2P) where direct communication without a base station may be employed, such as in a sidelink (SL) communication.

In 3GPP, NR-based access to unlicensed spectrum has initiated. The NR system is designed to be operable on licensed spectrum. The NR-unlicensed (NR-U), a shorthand notation of the NR-based access to unlicensed spectrum, is a technology to enable the operation of NR system using unlicensed spectrum. The technologies for NR-unlicensed can be categorized into those to support carrier aggregation (CA), dual connectivity (DC), or sidelink (SL) communications and standalone modes of network operation.

DETAILED DESCRIPTION

Figure 1:
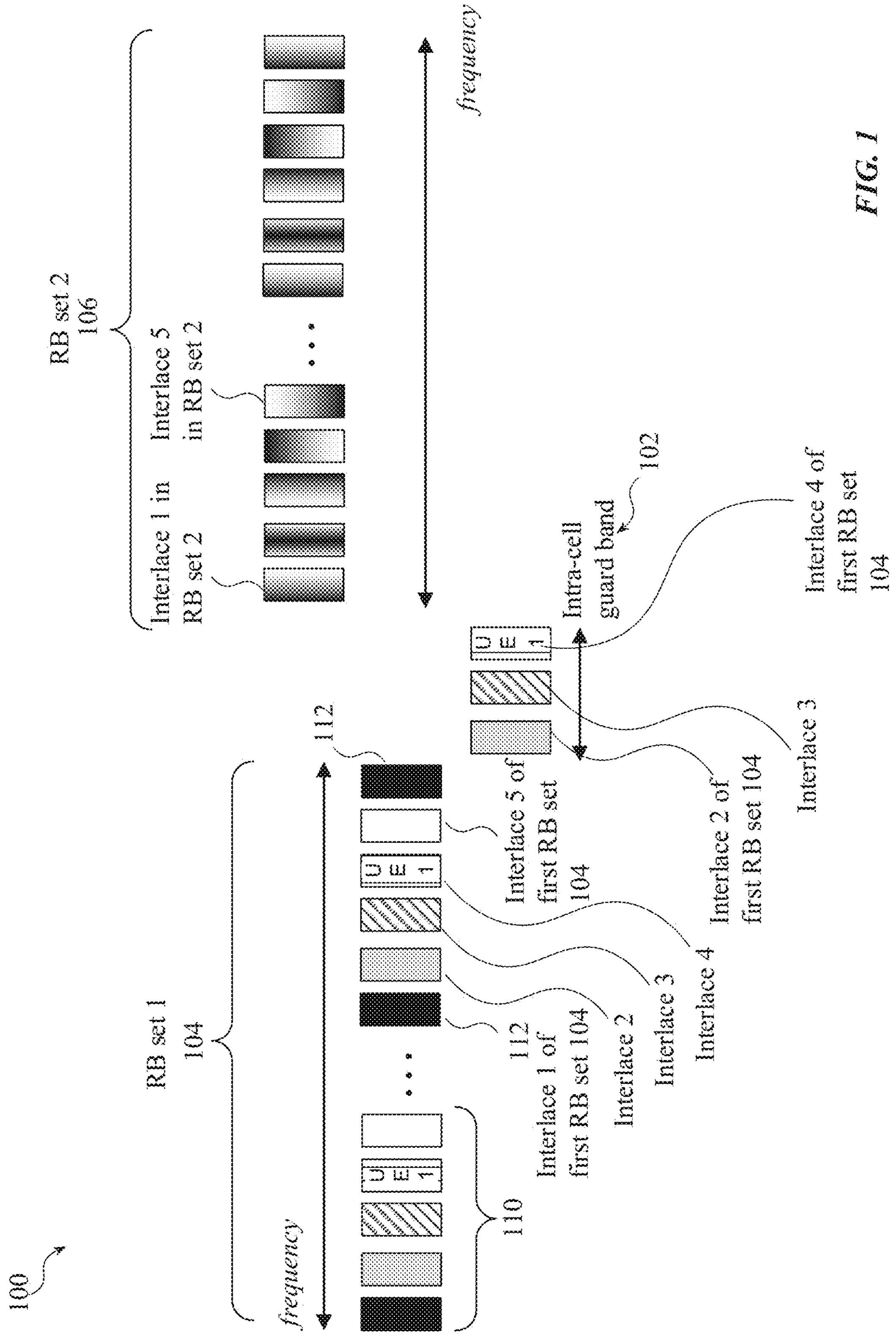
FIG. 1 illustrates an example of a sidelink (SL) communication including an intra-cell guard band configuration in accordance with various aspects discussed herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Various aspects including a user equipment (UE) device operating in sidelink (SL) communications. The UE device selects and configures resources to enable SL communication as described herein. The UE device can be a pedestrian UE (P-UE) device, a vehicle-to-everything (V2X) device, or other UE that may include vehicle-to-vehicle (V2V), vehicle-to-infrastructure (V2I), vehicle-to-pedestrian (V2P) device communication, or other direct communication between UEs, which can comprise an SL communication. A UE when referred to herein can also further include a Roadside Unit (RSU), a drone, other vehicle device, Internet of Things (IoT) device, or other user equipment device, for example.

Regarding new radio (NR) SL on unlicensed spectrum, various aspects are described to include NR SL physical channel structures and processes in light of regulatory requirements and associated changes to NR SL physical channel structures and procedures for operating on the unlicensed spectrum. For example, a resource pool for a physical sidelink control channel (PSCCH) or a physical sidelink shared channel (PSSCH) can have two resource block (RB) sets of resources or physical resource blocks (PRBs). The intra-cell guard band between adjacent RB sets can be used for an SL transmission (e.g., a PSSCH transmission) if the UE can transmit on the respective channels after a successful listen before talk (LBT) or clear channel assessment (CCA) procedure. In such multi-channel transmission, the UE can use both these RB sets for the SL transmission, such as a PSSCH transmission. Utilizing the resources of the intra-cell guard band can improve efficiency. However, various details for the physical channel design configuration in the unlicensed spectrum remain a focus of study, including the handling mechanism for potentially unequal sub-channel size, the configuration for interlaced RB based transmissions, and whether PRBs in the intra-cell guard band have a same interlaced index as PRBs for the PSSCH transmission in the two RB sets.

In another example, with NR SL transmissions, consideration is being made for how to structure the NR SL physical channel configuration to satisfy occupied channel bandwidth (OCB) regulatory requirements. These OCB regulations include, for example, that the OCB, which is the bandwidth containing 99% of the power of the signal, should be 80% to 100% of the nominal channel bandwidth (NCB). To satisfy OCB and power spectrum density regulations for SL synchronization signal block (SL-SSB) transmission, a subcarrier frequency spacing (SCS) of 15 kHz or 30 kHz is selected using interlaced resource block (RB) transmission, in which the S-SSB transmission for NR includes a physical sidelink broadcast channel (PSBCH), a sidelink primary synchronization signal block (S-PSS), and a sidelink secondary synchronization signal (S-SSS).

In an aspect, a UE can configure an SL transmission on PRBs in an intra-cell guard band based on an association of the PRBs with a first resource block (RB) set or with a second RB set of at least two adjacent RB sets, and then transmit the SL transmission comprising the first RB set and the second RB set with the intra-cell guard band between the at least two adjacent RB sets. The UE can associate the PRBs in the intra-cell guard band to an interlace indexing of the first RB set by counting interlaces in the intra-cell guard band consecutively or continuously from the PRBs of the first RB set, or backwards from an end of the second RB set, based on a resource pool (pre)configuration. Whether the association of the PRBs configured in the intra-cell guard band for the SL transmission is with the first or the second RB set of adjacent RB sets can be pre-defined or based on a resource pool (pre) configuration.

When configuring a dedicated sidelink (SL) channel between UEs (e.g., V2X/V-UEs, or other UEs) in an out-of-coverage scenario or in an unlicensed NR network, an initiating/initiator UE senses the SL channel to determine whether it is busy or not, and upon acquiring the SL channel communication provides sidelink control information (SCI) in two stages. The first stage SCI can be carried on a physical sidelink control channel (PSCCH) and comprises information to enable sensing operations on the acquired SL channel, as well as information about the resource allocation. A physical sidelink shared channel (PSSCH) transmits the second stage SCI and an SL shared transport channel for data transmission. The second stage SCI carries information to enable identification and decoding of the SL channel, as well as control for Hybrid Automatic Repeat Request (HARQ) procedures, and triggering for channel state information (CSI) feedback, or related information, including physical sidelink channel feedback (PSFCH). The physical SL shared channel (PSSCH) carries one or more transport blocks (TB) of data for SL transmission. The SCI includes information for the correct reception of the TB. Thus, various aspects being described enable and ensure that the TB of data in SL transmission by a receiving UE in an unlicensed NR network is decoded properly and the associated SCI is correctly received in SL communications.

In another aspect, when the PSSCH resources are being mapped on the intra-cell guard band the SCI stage 2 and the SL data, or only the SL data can be rate matched on the intra-cell guard band. Alternatively, or additionally, the PSSCH resource mapping on the intra-cell guard band can include a repetition of at least a portion of the SCI stage 2 and the sidelink data on the intra-cell guard band.

Various aspects further consider calculation of the transport block size (TBS) for the data SL transmission when utilizing interlaces for satisfying the OCB regulations in the SL. An SL interlace can have different sizes, or different numbers of physical resource blocks. As a result of the initial transmission and re-transmissions potentially having different numbers of physical resource blocks (PRBs) (e.g., 10 or 11 PRBs), an SL TBS may not be as reliable as possible, and may result in a potential inconsistency for the UE in calculating the TBS. Thus, various aspects include configuring the PRBs uniformly for the sake of reliability as well as satisfying defined regulatory rules. The number of PRBs, for example, can be predefined, (pre)configured based on a resource pool for SL transmission, or be dynamically indicated by the control information, the SCI. Additionally, or alternatively, the intra-cell guard band may be utilized for SL transmission, in which the PRBs in the intra-cell guard band may be counted, or not, in the TBS determination based on a predefined rule or a resource pool (pre)configuration (preconfigured or configured on the fly/dynamically).

Another focus for configuring and taking advantage of an increased efficiency of resource usage in the intra-cell guard band includes whether or not such PRBs can be used for PSFCH or S-SSB transmission. The PSFCH transmission in SL can be configured to be on the intra-cell guard band according to a resource pool (pre)configuration, be prohibited or only if a PSSCH/PSCCH transmission spans multiple RB sets. Each UE can use a dedicated PRB to transmit hybrid automatic repeat request (HARQ) acknowledgement (ACK) information accordingly. The common PRBs can correspond to an entire interlace, or be configured as a subset of an interlace for an associated PSSCH transmission. If the PSFCH transmission is on the intra-cell guard band according to a resource pool (pre)configuration, a bitmap can be used to indicate PRBs in the intra-cell guard band that belong to a PSFCH resource. In response to the PSFCH transmission occupying a common interlace, and a zero or one or more dedicated PRBs, the PRBs in the intra-cell guard band are configured for the PSFCH transmission according to the common interlace only, or both the common interlace and the one or more dedicated PRBs. When the PSFCH transmission occupies the dedicated PRBs and common PRBs, the PRBs in the intra-cell guard band are configured for the PSFCH transmission according to the common PRBs, or both the dedicated PRBs and the common PRBs In another aspect, the UE can be configured to transmit an S-SSB based on interlaces of the first RB set or the second RB set with 11 PRBs, and on a lowest interlace index or a highest interlace index from among those interlaces. An information element (IE) (e.g., "SL-SyncConfig" or other IE) could indicate whether to use the lowest interlace index or the highest interlace index, and which RB set to use from among the first RB set or the second RB set when a resource pool comprises multiple RB sets. These and other aspects are detailed below with reference to figures.

FIG. 1 is an example block diagram illustrating an example sidelink (SL) communication configuration 100 including the intra-cell guard band. The SL communication configuration 100 can be a physical channel design framework for SL on a new radio (NR) network in unlicensed spectrum (NR-U) (e.g., frequency range 1 (FR1) unlicensed spectrum). The SL communication configuration 100 includes a plurality of resource block (RB) sets comprising a first RB set (RB set 1) 104 and a second RB set (RB set 2) 106 that each include interlaces of physical resource block(s) (PRB(s)) (e.g., interlace 1 to 5).

The communication configuration 100 for SL communication can utilize an interlace RB-based PSCCH/PSSCH transmission in SL-U as means to at least satisfy the OCB/PSD requirements for various subcarrier spacing (SCS) (e.g., 15 kHz or 30 kHz). Each interlace (interlace 1 thru 5) includes a PRB within a cycle 110 of interlaces in an RB set. Each interlace of PRB(s) is shaded differently so that interlace 1 (in black) is located as the first interlace of each cycle 110. The first RB set 104 can have an SCS for SL-U that enables at least 5 cycles or repeated subsets of interlaces 1 thru 5 within each cycle with one PRB or interlace (e.g., interlace 112, black) to have 11. In this example interlace 1 can include 11 PRBs within the RB set 104, while the others include 10 PRBs, but a different SCS could enable a different number of total PRBs, for example.

When a resource pool enables multiple RB sets for SL transmission in SL-U the PRBs can also utilize the intra-cell guard band for PSSCH transmission if a UE (e.g., UE 310-1 of FIG. 3 or other UE) can transmit on respective LBT channels after performing a channel access procedure that is successful for each RB set of the multi-channels and the UE (e.g., UE 310-1 of FIG. 3 or other UE) uses both of at least two adjacent RB sets for the PSSCH transmission. A resource pool limits the radio resources for PSCCH and PSSCH since they cannot be transmitted in all resource blocks (RBs) and slots of NR, or even the frequency span of the NR SL. A resource pool can include the resource unit size, the time domain and frequency domain resources, as well as other resources for SL communication. The concept of resource pool can be also applied in autonomous resource allocation of UEs (e.g., mode 2 resource allocation) in SL-U, especially where resources are selected based on a sensing procedure on a specific resource pool. In the frequency domain, a resource pool is divided into sub-channels which are consecutive and non-overlapping PRBs (e.g., where the number of PRBs is ≥10). The size of a resource pool can be configured by higher layers or through signaling by a base station, in mode 1 for example. Transmission and reception resource pools may be also configured in a UE separately in mode 2, for example.

A sidelink resource pool can include an integer number n of RB sets (e.g., 102 and 102). PRBs within intra-cell guard band 102, 104 and 106, for example, can belong to a resource pool if the resource pool includes the two adjacent RB sets. PRBs within intra-cell guard band of two adjacent RB sets can be used for PSSCH transmission if a UE can transmit on the respective LBT channels in multi-channel case and the UE uses both of these two RB sets for PSSCH transmission. In other words, if both RB sets 104 and 106 frequency channels have a successful CCA, the UE can SL transmit with both RB sets 104 and 106.

In an aspect, the PRBs within intra-cell guard band 102 can be allocated from or associated with the interlaces of one of the two adjacent RB sets, e.g., the RB set 104 with a lower frequency (as indicated along the frequency horizontal axis). These PRBs (of the intra-cell guard band 102) can be treated as an extension of the RB set 104 when associating them with the corresponding interlaces.

The association of the PRBs of the first RB set 104 is illustrated to correspond with interlaces (e.g., interlaces 2, 3 and 4). There are 3 PRBs in the intra-cell guard band in the example of FIG. 1. These 3 PRBs are allocated to or associated with the first RB set 104, and can follow in the same order that continuously follows the cycles 110 of PRBs that belong to indexed interlaces 1 thru 5. For example, there are 5 interlaces in RB set 1, where the last PRB (i.e., before intra-cell guard band) in the first RB set 104 belongs to interlace 1 (e.g., 112). Then the first PRB in the intra-cell guard band belongs to interlace 2 of the first RB set 104, the second PRB in the intra-cell guard band belongs to interlace 3 of the first RB set 104, and the third PRB in the intra-cell guard band belongs to interlace 4 of the first RB set 104. Likewise, if the last interlace of the first RB set 104 was interlace 2, then the intra-cell guard band 102 could include PRBs that belong to interlaces 3 thru 5 as an extension or a continuation of the RB set 104. As such, the PRBs in the intra-cell guard band 102 can belong to the RB set 104 with a lower frequency than the intra-cell guard band 102 and the indexing of the interlaces in the intra-cell guard band can continue in counting order from the last interlace of the RB set in which the intra-cell guard band is associated with.

Figure 2:
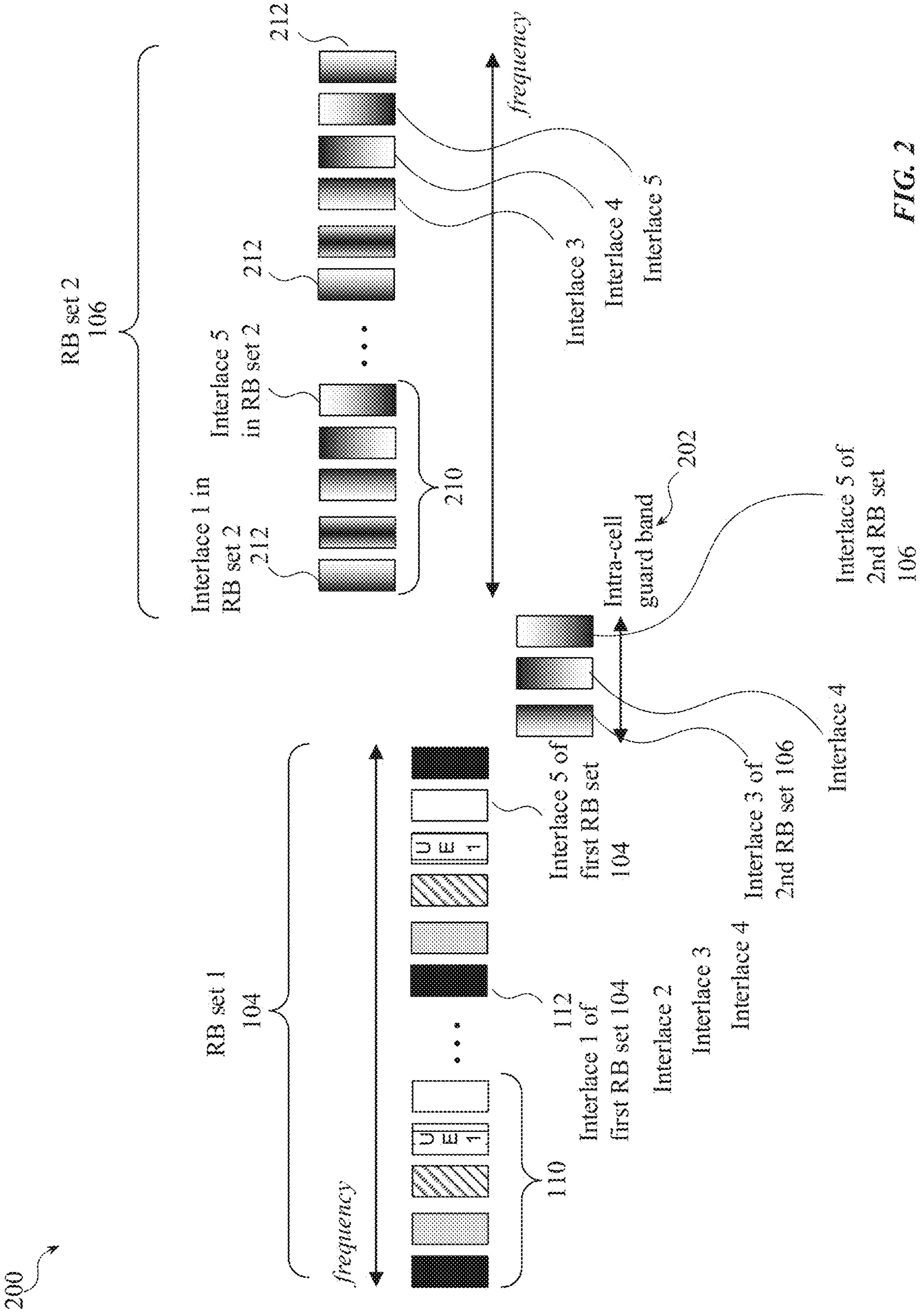
FIG. 2 illustrates another example of a sidelink (SL) communication including an intra-cell guard band configuration in accordance with various aspects discussed herein.

Additionally, or alternatively, the PRBs belonging to the interlaces of the intra-cell guard band can be associated with interlaces in reverse order of an interlace cycle as a backwards or reverse extension, in which the interlaces of the intra-cell guard band are counted or indexed backwards from the last interlace in the associated RB set (as further illustrated with FIG. 2).

Alternatively, the PRBs belonging to interlaces of the intra-cell guard band 102 could be associated with PRBs of that belong to the second RB set 106 among the two adjacent RB sets. The association to which RB set that the intra-cell guard band PRBs are associated with (the first or the second adjacent RB set 104, 106) can be based on a resource pool (pre)configuration or a (pre)defined rule, for example. In one aspect, all of the PRBs of the intra-cell guard band between the two adjacent RB sets 104 and 106 can be counted to a single RB set or associated to one RB set from among the two RB sets.

FIG. 2 illustrates another example of sidelink (SL) communication configuration including the intra-cell guard band with PRBs that belong to interlaces associated with the second RB set among adjacent RB sets. The SL communication configuration 200 can be a physical channel design framework for SL on a new radio (NR) network in unlicensed spectrum (SL-U) (e.g., frequency range 1 (FR1) unlicensed spectrum). Similar to FIG. 1, the SL communication configuration 200 includes a plurality of resource block (RB) sets comprising a first RB set (RB set 1) 104 and a second RB set (RB set 2) 106 that each include interlaces of physical resource block(s) (PRB(s)) (e.g., interlace 1 to 5).

Rather than the intra-cell guard band 202 being associated with the first RB set as in FIG. 1, the intra-cell guard band 202 is allocated to or corresponds with the second RB set 106. Thus, the PRBs in the intra-cell guard band 202 belong to the RB set 106 that has a higher frequency than the intra-cell guard band 202. Whether the PRBs in the intra-cell guard band belong to the first RB set 104 or the second RB set 106 can be based on resource pool (pre)configuration or be pre-defined. For example if pre-defined, the associated of PRBs belonging to interlaces in the intra-cell guard band could be associated with the first RB set 104 of adjacent RB sets; alternatively, it could be associated with the second RB set 106. Each of the PRBs of the intra-cell guard band between two adjacent RB sets can belong to or be counted to a single RB set.

In an aspect, the PRBs belonging to the interlaces of the intra-cell guard band (e.g., 202) can be associated with interlaces in reverse order of an interlace cycle (e.g., 210) as a backwards extension of the interlaces that end the second RB set, in which they are counted or indexed backwards from the last interlace 212 in the RB set (e.g., RB set 106). For example, the intra-cell guard band 202 includes a lower frequency than the RB set that it is associated with and from right to left includes interlace 3 of the second RB set 106, followed by interlace 4 of the second RB set 106, and then interlace 5 of the second RB set 106. Thus, the intra-cell guard band 202 is configured as a backwards extension of the PRBs of interlaces in the RB set in which it is associated with, for example.

Figure 3:
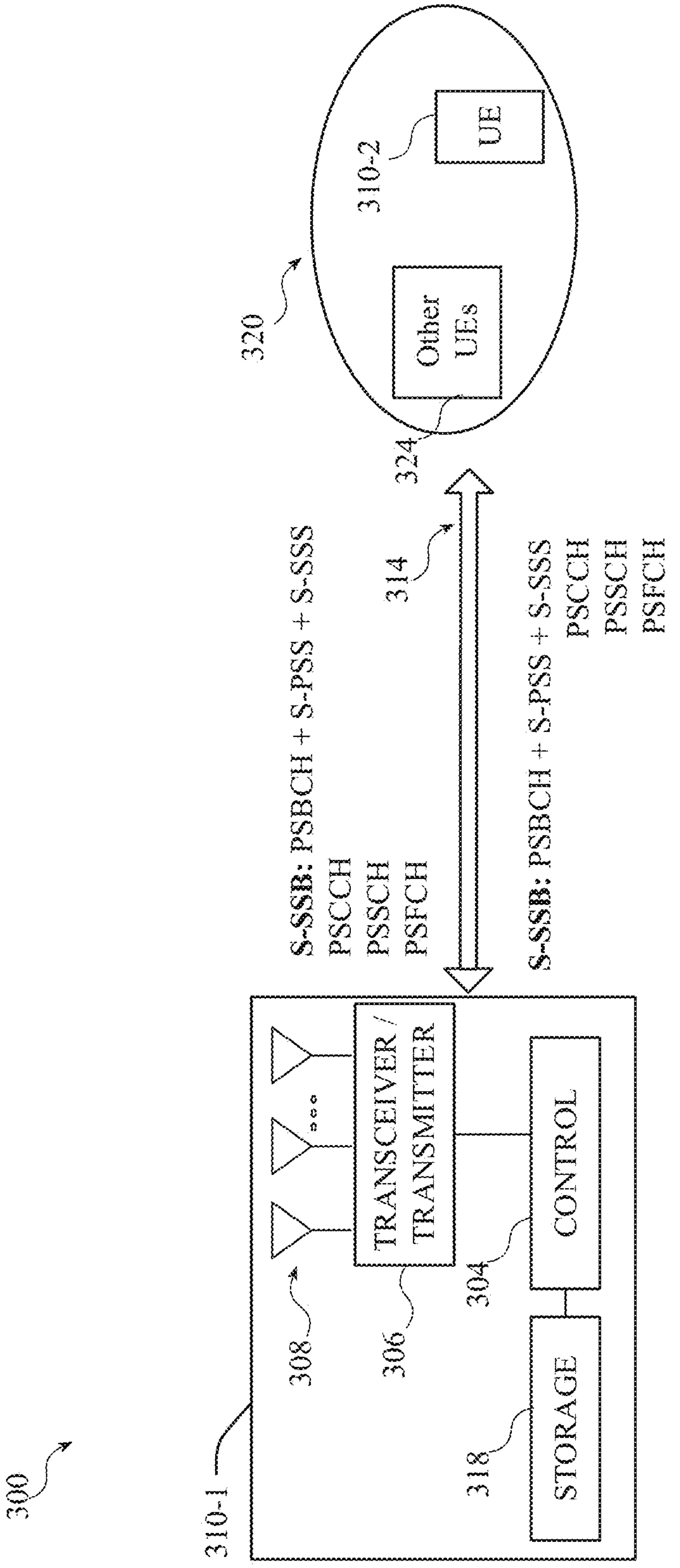
FIG. 3 illustrates an exemplary block diagram illustrating an example of user equipment(s) (UEs) communicatively coupled with network components as peer devices useable in connection with various embodiments (aspects) described herein.

FIG. 3 is a diagram illustrating a system 300 of implementation for any of the aspects herein associated with SL communication as a direct communication with one or more UEs such as a pedestrian UE, a vehicle UE, or as another network device. The system 300 facilitates SL communications by enhancing reliability and accuracy to data during power saving procedures such as resource selection procedures, partial or reduced sensing operations, re-evaluation/pre-emption checking for transmissions in SL operation, and congestion control.

The system 300 includes a UE 310-1, a transceiver 306, and participant device entities 320, which can represent V-UEs (e.g., UEs 324), or any UE 310-2 operating on an unlicensed network or NR unlicensed network that could participate in SL communication as a direct communication with another UE or network device. The UE 310-1, for example, includes the transceiver 306, a storage component 318, and control circuitry or controller 304. The storage component 318 includes a memory, storage element or other data store configured to store information for the UE 310-1. The controller 304 is configured to perform various operations associated with the UE 310-1. The controller 304 can include logic, components, circuitry, one or more processors (baseband circuitry, including baseband processor(s) or other processing circuitry with internal or external memory coupled thereto) for configuring SCI and SL communications. The transceiver 306 includes transmitter functionality and receiver functionality. The UE 310-1 also includes one or more antenna 308 for SL communications of an SL channel 314, which includes emergency services broadcast communications as well as SCI with the participant entities 320.

The participant device entities 320 include one or more other UEs 310-2, including infrastructure entities, vehicle entities, smart glass, and the like. The communications between the UE 310-1 and the participating device entities 320 includes Vehicle to Everything (V2X) devices, which further includes Vehicle to Vehicle (V2V), Vehicle to Infrastructure (V2I) and Vehicle to Pedestrian (V2P), and other network components or devices. The entities 320 can also include a road side unit (RSU), which is an entity that supports V2I and is implemented in a base station (e.g., gNB, eNB, etc.) or a stationary/non-stationary UE/IoT, for example.

The sidelink communications between the UE 310-1 and the participating device entities 320 can utilize co-operative awareness that includes information from other vehicles, sensors, and the like, to process and share the information to provide vehicle services such as collision warning, autonomous driving, and the like. SL communications can be between UEs that may be served by an evolved universal terrestrial access network (E-UTRAN) or where at least one of communicating UE may be out of network coverage for mode-2 SL communication or for operating in the NR unlicensed band, for example.

In some aspects, when configuring a dedicated sidelink (SL) channel 314 between one or more UEs 310-2 (e.g., V2X/V-UEs, or other UEs 324) in an out-of-coverage scenario or in an unlicensed NR network, for example, the UE 310-1 can operate as the initiating/initiator UE, for example, by sensing the SL channel 314 to determine whether it is busy or not, and upon acquiring the SL channel communication provides SCI. A first stage of the SCI, stage 1, can be carried on the PSCCH with information to enable sensing operations on the acquired SL channel, as well as information about the resource allocation for feedback or PSFCH transmission including an acknowledgement or non-acknowledgement (ACK/NACK) of a hybrid automatic repeat request (HARQ). The PSSCH transmits the second stage SCI (SCI stage 2) and an SL shared transport channel. The second stage SCI carries information to enable identification and decoding of the SL channel, as well as control for HARQ procedures, and triggering for CSI feedback, or related information, including PSFCH. Both UEs, UE 310-1 and 310-2, for example, can transmit the S-SSB, including PSBCH, S-PSS, and S-SSS for initiating SL communications and both UEs can schedule its own physical layer data, for example.

In an aspect, the UE 310-1 can be configured to transmit SL transmissions comprising a first RB set 104 and a second RB set 106 as adjacent RB sets of an SL resource pool. The intra-cell guard band 102 or 202, for example, can be used to extend the resources of either RB set between the two adjacent RB sets. PRBs in the intra-cell guard band can be configured for the SL transmission based on an association with the first RB set 104 or with the second RB set 106. For example, the PRBs of the intra-cell guard band 102 or 202 can belong to the first RB set with a lower frequency than the intra-cell guard band, or the PRBs of the intra-cell guard band 102 or 202 can belong to the second RB set with a higher frequency than the intra-cell guard band. For example, the UE 310-1 thus can associate the PRBs in the intra-cell guard band 102 or 202 to an interlace indexing of the first RB set by counting interlaces in the intra-cell guard band consecutively or continuing from the PRBs of the first RB set, or backwards from an end of the RB set. Likewise, with the second RB set the intra-cell guard band can associate PRBs of the interlaces consecutively or continuing from the PRBs of the second RB set, or backwards from an end of the RB set. Which RB set to associate the PRBs of the intra-cell guard with or correspond them to can be determined based on a resource pool (pre)configuration or a pre-defined determination, for example.

In another aspect, the UE 310-1 can perform PSSCH mapping of PRBs on the intra-cell guard band (e.g., 102, or 202) by rate matching a portion of bits associated with SCI stage 2 and another portion of bits associated with SL data on the intra-cell guard band. Alternatively, or additionally, rate matching can involve the portion of bits associated with the SL data only on the intra-cell guard band.

Rather than rate matching, the UE 310-1 can perform a PSSCH mapping of PRBs on the intra-cell guard band by repeating a portion of rate matched bits associated with SCI stage 2 and SL data of the first RB set or the second RB set on a corresponding interlace in the intra-cell guard band; and thus, instead of mapping a different portion of bits mapped within the RB set to the intra-cell guard band as an extension, a portion of the mapped bits (for SCI stage 2 and data) in the associated RB set can be repeated, for example. The portion of repeated bits can correspond to a first or a last portion of mapped bits to a first PRB or last PRB associated with portions of the mapped bits, for example.

In another aspect, the UE 310-1 can determine an SL transport block size (SL TBS) for an initial data transmission and a data re-transmission with a number of PRBs per interlace based on a pre-defined number (e.g., 10 PRBs or 11 PRBs). Alternatively, or additionally, the SL TBS can be based on whether or not the number of PRBs used to calculate the SL TBS includes PRBs in the intra-cell guard band. If the SL TBS includes PRBs in the intra-cell guard band, the number of PRBs can be pre-defined that each interlaces always has 11 PRBs for purposes of calculating the SL TBS. Otherwise, the number can be 10 PRBs, for example, where the intra-cell guard band PRBs are not included to calculate the SL TBS. Alternatively, or additionally, indication to include PRBs in the intra-cell guard band and the number of PRBs for calculating the SL TBS can be based on a resource pool (pre)configuration, or based on a dynamic indication of a stage one SCI or a stage two SCI, in which the number of PRBs can comprise 10 PRBs or 11 PRBs.

In yet another aspect, the UE 310-1 can determine to transmit a PSFCH transmission on the intra-cell guard band based on a resource pool (pre)configuration. Alternatively, this could not be allowed or be prohibited as a prohibition, or could be allowed when a PSSCH/physical SL control channel (PSCCH) spanning a plurality of RB sets in an unlicensed spectrum. Determining to transmit the PSFCH transmission on the intra-cell guard band could be also based on the resource pool (pre)configuration and a bitmap that indicates the PRBs in the intra-cell guard band belonging to a PSFCH resource. If the PSFCH transmission occupies a common interlace, and a zero or one or more dedicated PRBs, then the PRBs in intra-cell guard band can be configured for the PSFCH transmission according to the common interlace only, or both the common interlace and the one or more dedicated PRBs. If the PSFCH transmission occupies dedicated PRBs and common PRBs, then the PRBs in the intra-cell guard band can be configured for the PSFCH transmission according to the common PRBs, or both the dedicated PRBs and the common PRBs.

The UE 310-1 can also be configured to transmit an S-SSB based on interlaces of the first RB set or the second RB set that are with 11 PRBs, and on a lowest interlace index or a highest interlace index. Alternatively, or additionally, an information element (IE) (e.g., SL-SyncConfig IE) can indicate whether to use the lowest interlace index or the highest interlace index, and indicate which RB set to use from among the first RB set 104 or the second RB set 106 when a resource pool comprises multiple RB sets.

Figure 4:
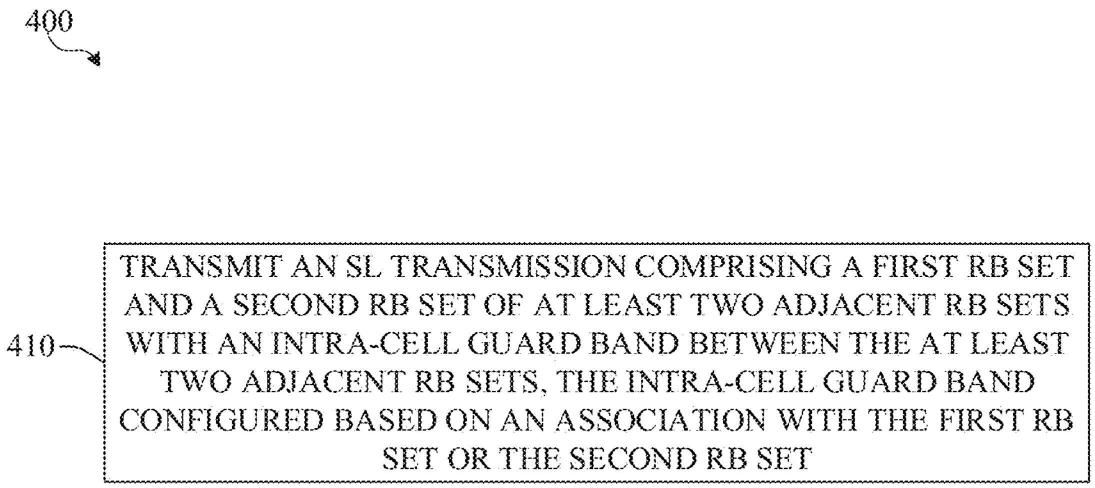
FIG. 4 an example process flow for sidelink (SL) communication with an intra-cell guard band configuration in accordance with various aspects discussed herein.

FIG. 4 illustrates an example process flow for configuring an intra-cell guard band for SL in SL-U. The process flow 400 initiates at 410 with transmitting an SL transmission comprising a first RB set and a second RB set of at least two adjacent RB sets with an intra-cell guard band between the at least two adjacent RB sets. The PRBs in the intra-cell guard band are configured for the SL transmission based on an association with the first RB set or with the second RB set. The UE (e.g., 310-1) can configure the SL transmission on PRBs in an intra-cell guard band 102 or 202 based on an association of the PRBs with a first RB set or with a second RB set of at least two adjacent RB sets of a resource pool. The UE 310-1, for example, can then transmit the SL transmission comprising the first RB set and the second RB set with the intra-cell guard band between the at least two adjacent RB sets. The PRBs of the intra-cell guard band can belong to the first RB set with a lower frequency than the intra-cell guard band, or belong to the second RB set with a higher frequency than the intra-cell guard band. The UE can associate the PRBs in the intra-cell guard band to an interlace indexing of the first RB set by counting interlaces in the intra-cell guard band consecutively or continuously from the PRBs of the first RB set, or backwards from an end of the second RB set, based on a resource pool (pre) configuration.

Figure 5:
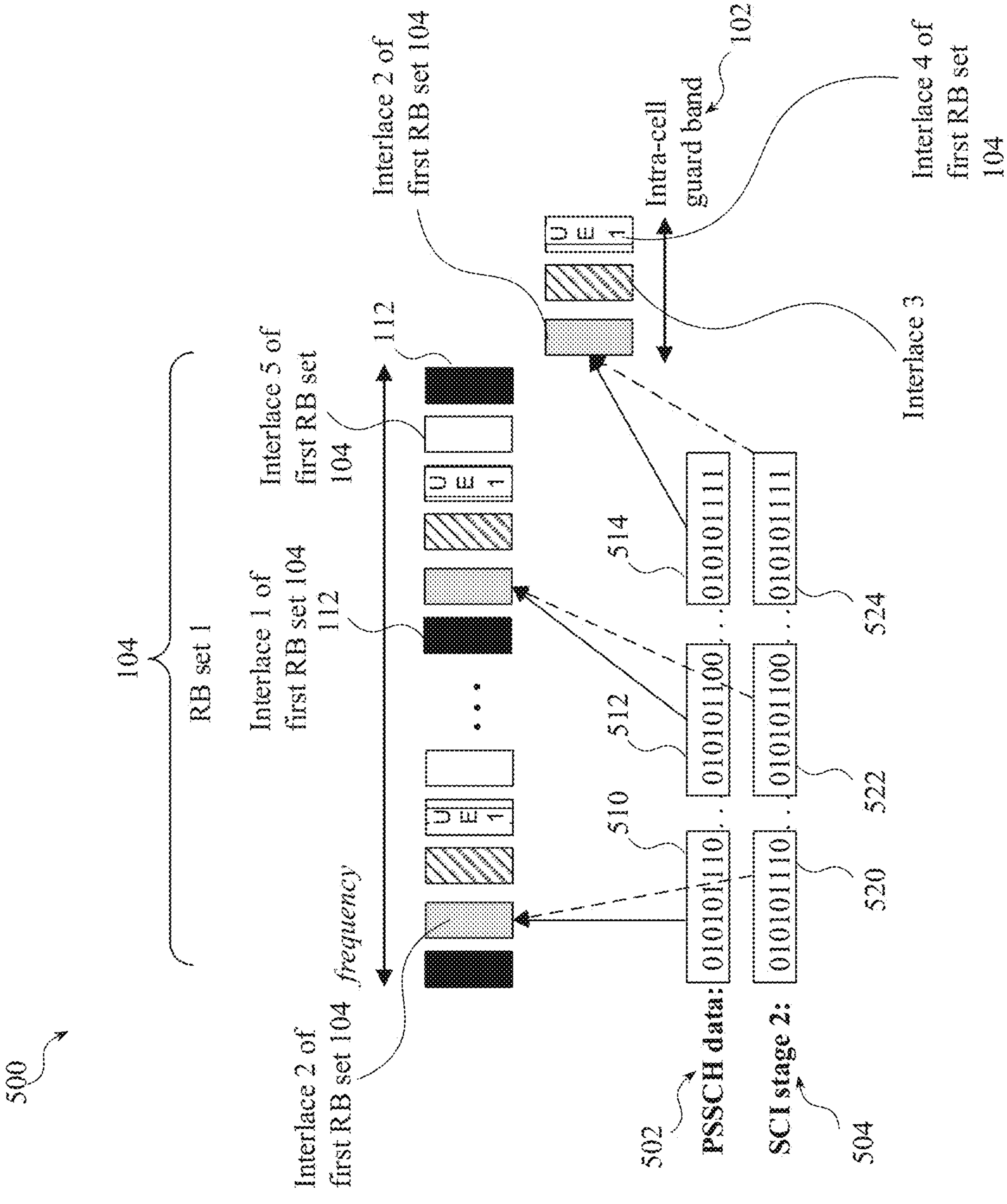
FIG. 5 illustrates an example configuration for resource mapping bits for SL communication according to various aspects.

FIG. 5 illustrates an example of resource mapping 500 on the intra-cell guard band. The UE 310-1, for example, can perform PSSCH resource mapping of PRBs on the intra-cell guard band 102 by rate matching a portion of bits 524 associated with SCI stage 2 504 and another portion of bits 514 associated with SL PSSCH data 502 on the intra-cell guard band 102. In this example, the portions of bits 514 and 524 correspond to a last portion of bits for the PSSCH data 502 and SCI stage 2 504, respectively. These may not necessarily correspond to the same portion as one another, and either may have different portions of bits (e.g., portion of bits 510 or 512 of the PSSCH data 502, or portions of bits 520 or 522 of SCI stage 2 504) being rate matched or mapped to an interlace (e.g., interlace 2 of the first RB set 104 or other RB set) of the intra-cell guard band, for example. In the example of resource mapping 500, PSSCH resource mapping on the intra-cell guard band 102 (or alternatively 202 of FIG. 2) can include rate matching both the sidelink data as PSSCH data 502 and SCI stage 2 504. In this example, the portions of bits 510 thru 514 are mapped by rate matching to the second interlace or interlace 2 of RB set 104, but another or other PRB belonging to another interlace could be used as well, and rate matching is not necessarily limited to any one particular interlace, but could also correspond to other interlaces of the intra-guard band 102, for example.

Alternatively, or additionally, the second RB set (RB set 2) 106 could be used for PSSCH resource mapping on the intra-cell guard band 202 in a same or similar configuration. In this aspect, the PRBs of the intra-cell guard band 202 can be resource mapped to the second RB set 106 after the PRBs in the RB set are resource mapped, as in a reverse manner.

Figure 6:
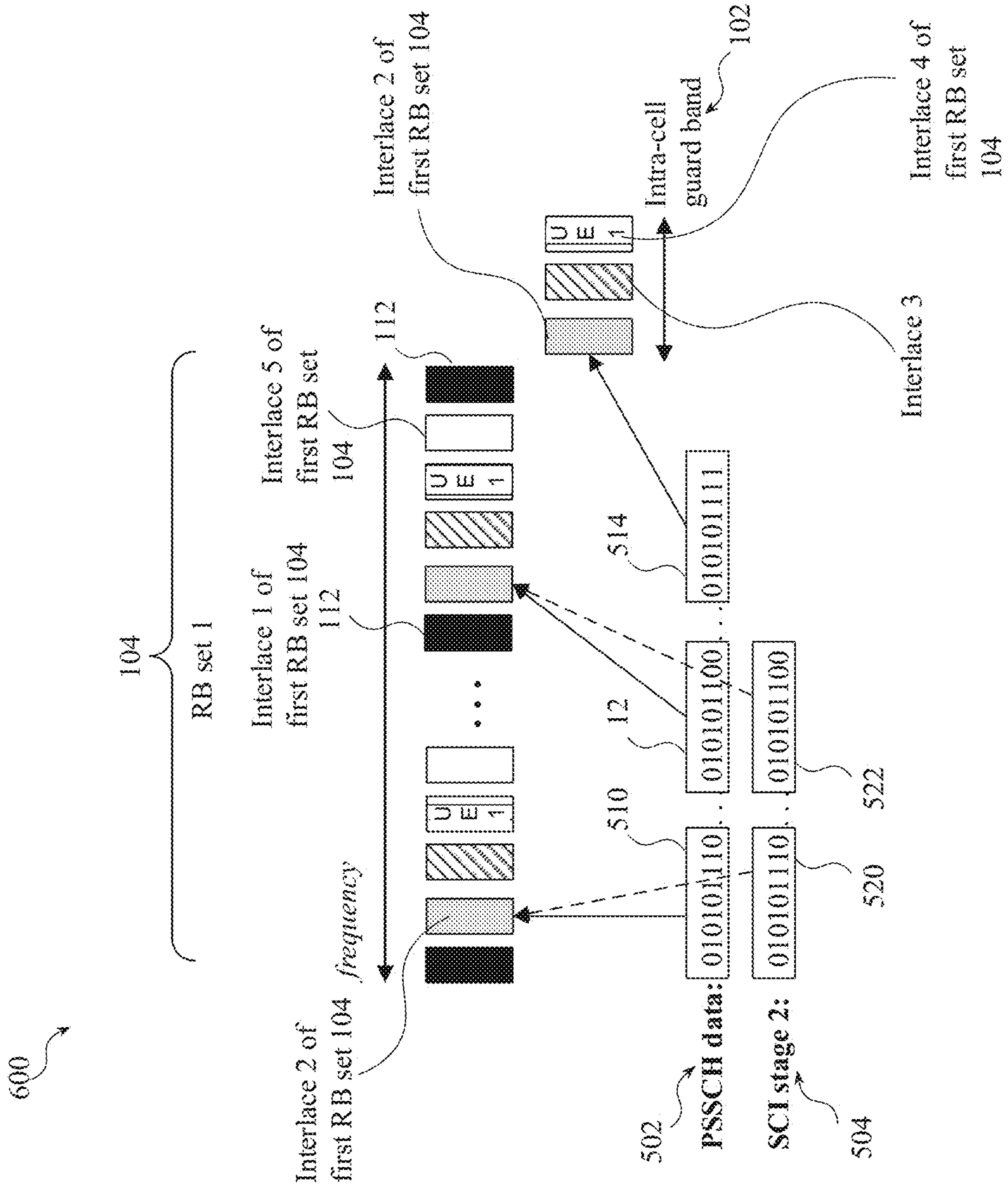
FIG. 6 illustrates another example configuration for resource mapping bits for SL communication according to various aspects.

FIG. 6 illustrates another example of resource mapping 600 on the intra-cell guard band. Resource mapping is similar to resource mapping 500 of FIG. 5, although only the sidelink PSSCH data 502 has a portion of bits 514 rate matched to an interlace (e.g. interlace 2 of the first RB set 104), and there is no rate matching of SCI stage 2 504 to the intra-cell guard band 102. As such, SCI stage 2 is not transmitted on the intra-cell guard band. The SCI stage 2 could demand more reliable transmission so this option may be more feasible by not transmitting on the intra-cell guard band 102, which may not be as reliable of a transmission. As a result bits from SCI stage 2 can be mapped to the normal interlaces in this normal first RB set 104, but not rate matched to the additional PRBs include or extended by the intra-cell guard band 102. However, the PSSCH data 502 could continue to use the intra-cell guard band 102 to deliver its corresponding rate matched bits, for example. Similar to FIG. 5, the same could be configured with the second RB set, especially when the intra-cell guard band is associated with the second RB set as in the example of intra-cell guard band 202 of FIG. 2.

Figure 7:
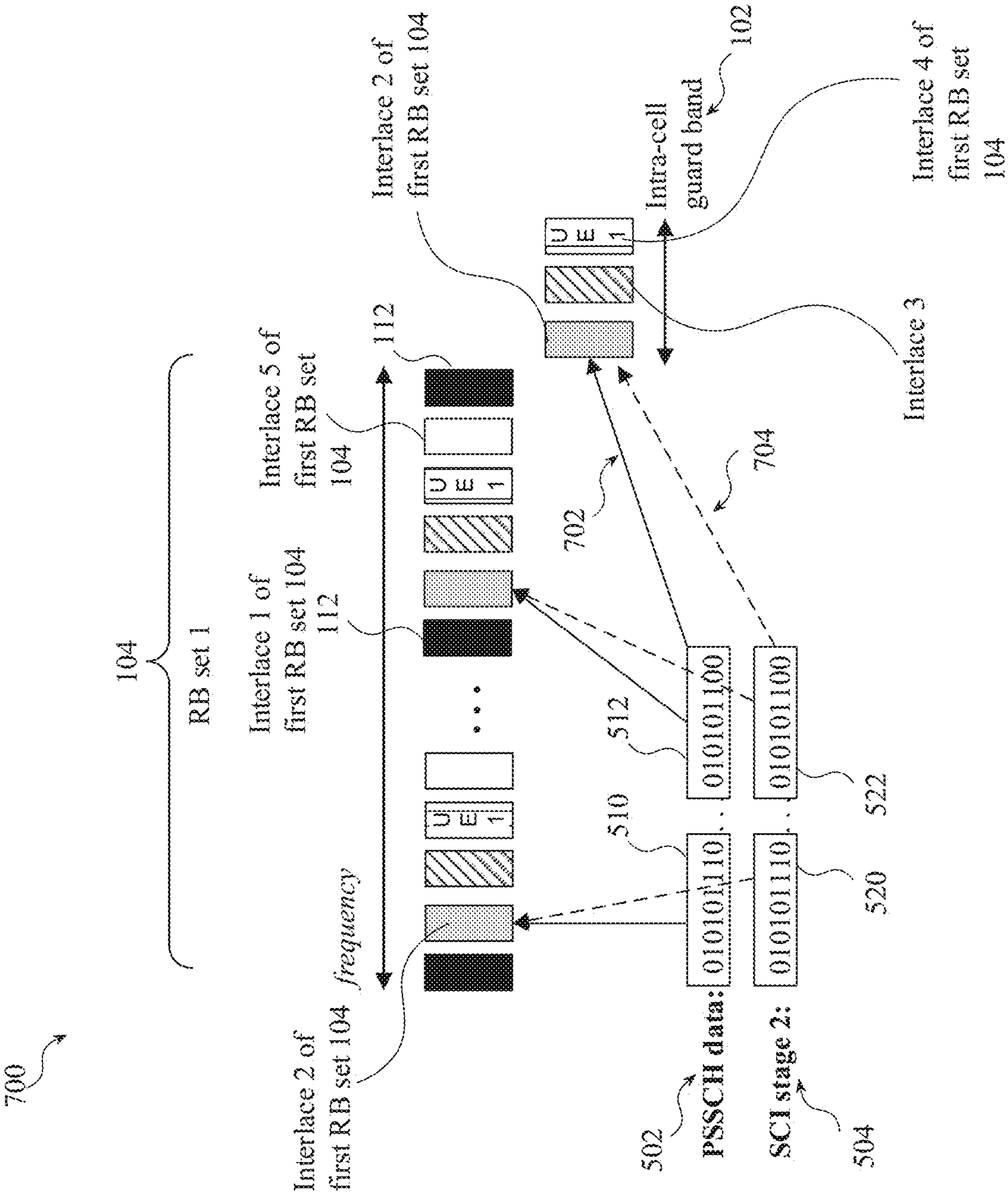
FIG. 7 illustrates another example configuration for resource mapping bits for SL communication according to various aspects.

FIG. 7 illustrates another example of resource mapping 600 on the intra-cell guard band. Rather than only rate matching different portions bits to PRBs belonging to an interlace and included in the intra-cell guard band as in FIGS. 5 and 6, the UE 310-1 maps portions of bits by repeating PSSCH including both SCI stage 2 and sidelink data on the intra-cell guard band 102. For example, a last portion of bits 512, 522 on a last PRB from among mapped PRBs belonging to an interlace (e.g., interlace 2 of different cycles of mapped bit portions) can be repeated by being mapped to the same interlace (interlace 2) within the intra-cell guard band 102, as illustrated by the repetition of mapping arrows 702 and 704 to both the interlace 2 of the intra-cell guard band 102 and to an interlace 2 in the last cycle of interlaces of the first RB set 104. As such, the bits mapped to the last PRB of the interlace being mapped with portions of bits of PSSCH data 502 and SCI stage 2 in the associated RB set 104 (or 106) can be repeated on the corresponding PRB in the intra-cell guard band 102 (or 202 of FIG. 2). Alternatively, or additionally, the bits mapped to the first PRB of cycle 110 of FIG. 1 of the interlace (e.g., interlace 2) in the associated RB set 104 can be repeated on the corresponding PRB in the intra-cell guard band 102 (or 202). Therefore, repetition could be from the last PRBs in the RB set 104 or could be from the first PRBs of the RB set that are copied to the PRBs in the intra-cell guard band 102. So that is about the resource mapping of the PSSCH.

Figure 8:
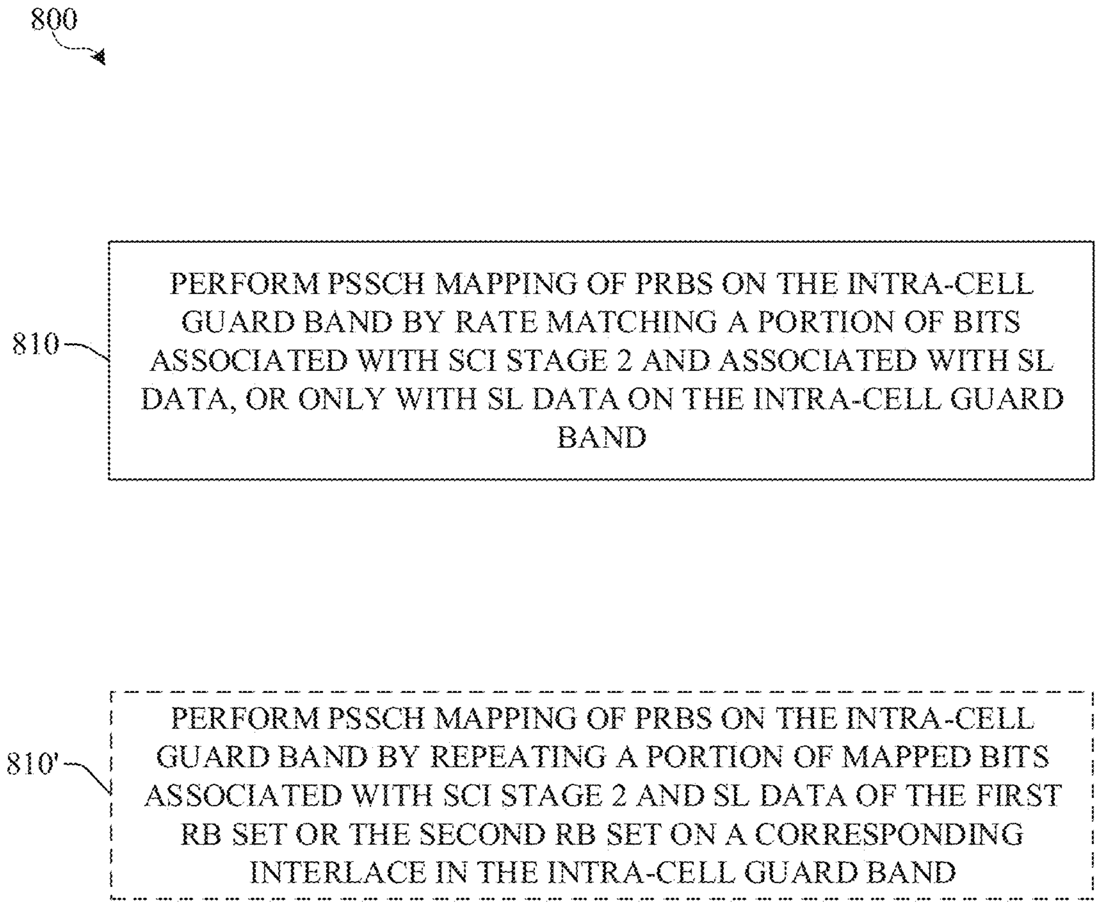
FIG. 8 illustrates another example process flow for resource mapping bits for SL communication according to various aspects.

FIG. 8 illustrates an example process flow 800 for PSSCH resource mapping on an intra-cell guard band, which is between adjacent RB sets. The process flow 800 initiates at 810 with performing PSSCH mapping of PRBs on the intra-cell guard band by rate matching a portion of bits associated with SCI stage 2 and associated with SL data, or only with SL data on the intra-cell guard band. Alternatively, or additionally, the process flow 810' can comprise performing PSSCH mapping of PRBs on the intra-cell guard band by repeating a portion of mapped bits associated with SCI stage 2 and SL data of the first RB set or the second RB set on a corresponding interlace in the intra-cell guard band. Here, the portion of mapped bits can comprises bits corresponding to a first PRB, or a last PRB, among PRBs belonging to an interlace(s) with mapped bits, of the first RB set 104 or the second RB set 106, depending on which RB set is associated with the intra-cell guard band, either by a resource (pre) configuration, a predefined determination, dynamic indication via SCI or other higher layer indication, for example.

Figure 9:
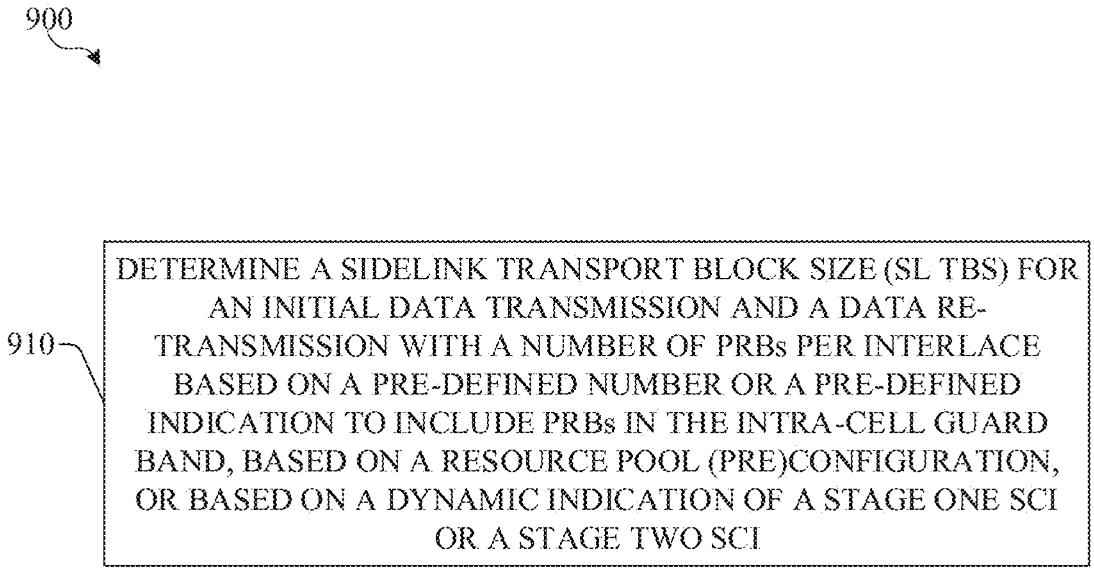
FIG. 9 illustrates an example process flow for determining a transport block size (TBS) in SL communications according to various aspects.

FIG. 9 illustrates an example process flow 900 for determining an SL transport block size (TBS) for SL communications. The PSSCH carries a transport block (TB) of data for SL transmission on the PSSCH. The SCI can include resource information of resource pool(s) for the correct reception of the TB. Thus, various aspects being described enable and ensure that the TB of data in the SL transmission by a receiving UE in an unlicensed NR network is decoded properly and the associated SCI is correctly received in SL communications. This can be done by ensuring that the number of PRBs are the same across different interlaces because this number is used to calculate the SL TBS transport block size.

A UE 310-1, for example, at 910 of process flow 900 determines a sidelink transport block size (SL TBS) for an initial data transmission and a data re-transmission with a number of PRBs per interlace based on a pre-defined number or a pre-defined indication to include PRBs in the intra-cell guard band. For example, the UE 310-1 could be indicated or pre-determined/pre-defined to not include PRBs in the intra-cell guard band 102 or 202 for purposes of calculating the TBS, and thus, the number of PRBs for the SL TBS calculation could be 10 PRBs. Alternatively, an indication or pre-definition for the term $n_{PRB}$ as the total number of PRBs in the calculation could be indicated as 10 PRBs or include an indication such as by the SCI stage 1 or SCI stages 2 or by resource pool (pre)configuration that the intra-cell guard band is not included for purposes of SL-TBS calculations, thereby being defined as 10 PRBs, for example.

Alternatively, the total number of PRBs for SL-TBS calculation could be pre-defined as 11 PRBS or an indication could be to include PRBs in the intra-cell guard band in the SL TBS calculation and thus 11 PRBs. Thus, each interlace will always have 11 PRBs for purposes of SL-TBS calculation. The indication, for example, could be a dynamic indication by the SCI (e.g., SCI stage 1 or SCI stage 2) or depend on a resource pool (pre)configuration. Regardless, of whether the total number of PRBs is 10 or 11 PRBs for SL TBS calculation, the number is consistent for an initial transmission and a retransmission.

In SL-U, it is possible that each interlace may contain a different number of PRBs. For example, one interlace is composed of 10 PRBs and another interlace is composed of 11 PRBs. If initial transmission and retransmission use two interlaces with different numbers of PRBs, then the sidelink TBS calculation based on the actual number of PRBs of an interlace will lead to TBS misalignment between initial transmission and retransmission. To avoid this issue, a reference number of PRBs per interlace is used for the sidelink TBS determination. This reference number could be pre-defined or (pre)configured by the resource pool.

The UE 310-1 can determine the total number of REs allocated for PSSCH $$(N_{RE}) \text{ by } N_{RE} = N'_{RE} \cdot n_{PRB} - N_{RE}^{SCI,1} - N_{RE}^{SCI,2},$$

where $n_{PRB}$ is the total number of allocated PRBs for the PSSCH;

$$N_{RE}^{SCI,1}$$

is the total number of REs occupied by the PSCCH and PSCCH demodulation reference signal (DM-RS).

$$N_{RE}^{SCI,2}$$

is the number of coded modulation symbols generated for $2^{nd}$-stage SCI transmission (prior to duplication for the $2^{nd}$ layer, if present). The number of PRBs $n_{PRB}$ can be dynamically indicated in an SCI either via SCI stage 1 (e.g., by using a reserved bit) or via SCI stage 2 (e.g., via a new format). Whether to use the intra-cell guard band in the calculation of the SL-TBS can be based on a (pre)configuration of either a resource pool or a sidelink bandwidth part (BWP), or based on a dynamic indication of a stage one SCI or a stage two SCI, in which the number of PRBs comprises 10 PRBs or 11 PRBs. If the higher layer parameter of a transmission structure for PSCCH and PSSCH (e.g., transmissionStructureForPSCCHand PSSCH) is set to 'interlaceRB', a reference number of PRBs ($n_{ref}$) per interlace within one RB set, numRefPRBOfInterlace, can be provided by higher layers for determination of a total number of PRBs for PSSCH, that is $n_{PRB}=n_{ref}*n_{inter,\ subCH}*n_{subCH}*n_{RB-set}$, where $n_{inter,\ sub,CH}$ is given by the higher layer parameter number interlace per subchannel (numInterlacePerSubchannel), $n_{subCH}$ is the number of occupied sub-channels within on RB set for the PSSCH, and $n_{RB-set}$ is to number of occupied RB sets for the PSSCH. For interlace RB-based PSCCH/PSSCH transmission in SL-U, considering one sub-channel equals K interlace(s), the N_ref or $n_{ref}$ can be (pre)configured, where the value range for N_ref at least includes 10 to 11, as a set of 10 and/or 11. By defining the total number of PRBs $n_{PRB}$ a unified design can be configured, otherwise in the initial transmission and the retransmission if there were different numbers of interlaces and their numbers were different the calculated TBS would be different.

Figure 10:
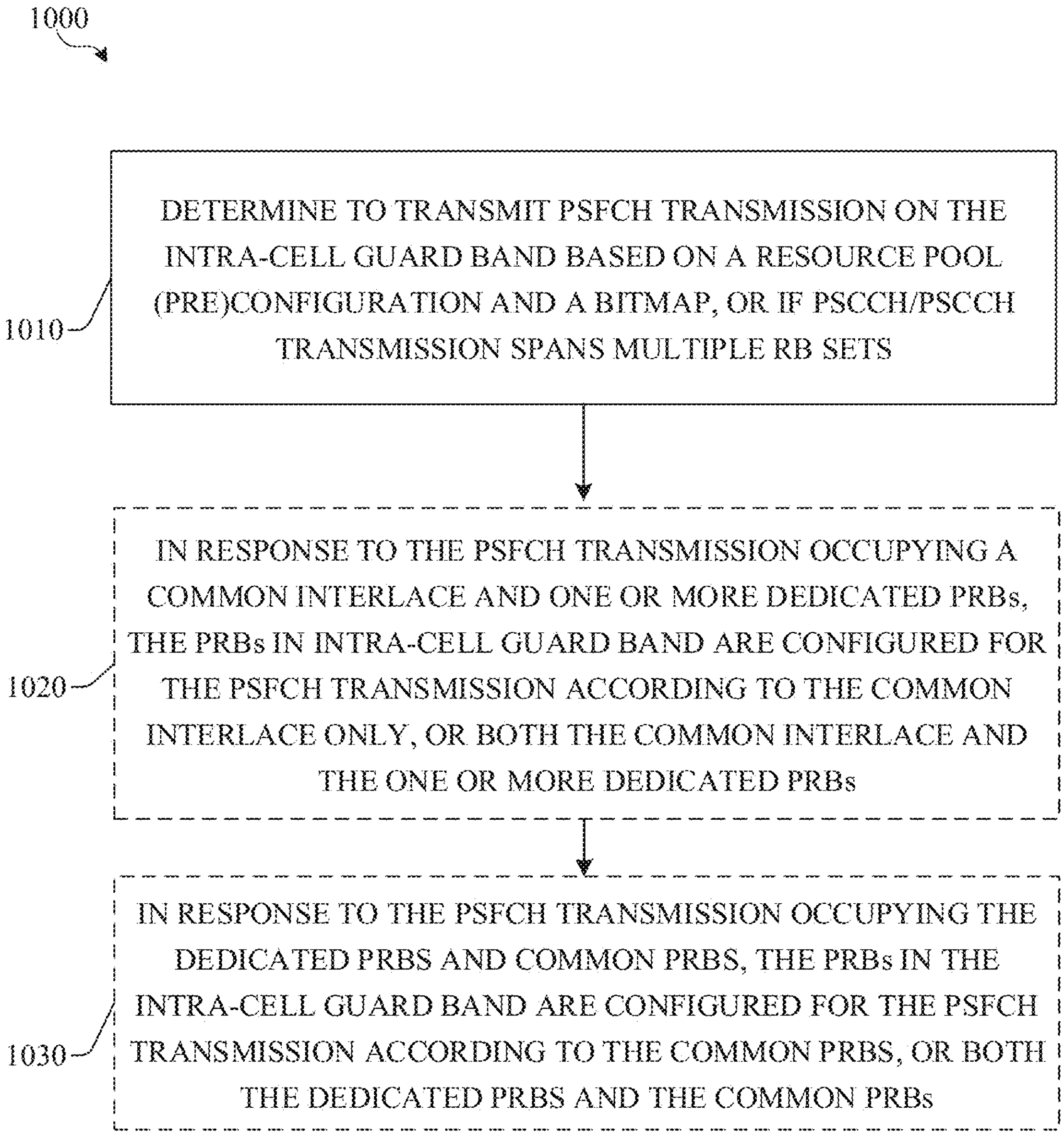
FIG. 10 illustrates example process flow of SL feedback for SL communication according to various aspects.

FIG. 10 is an example process flow for PSFCH transmission. With reference to FIG. 3, UE 310-1 can be configured to transmit PSFCH so that each PSFCH transmission can occupy both dedicated PRBs 902 for a carrier cell and common PRBs. Alternatively, each PSFCH transmission can occupy a common interlace and a zero or one or more dedicated PRBs. The PSFCH can carry HARQ-ACK or NACK information using symbols, for example, in one carrier cell.

In an aspect, the PSFCH transmission can be restricted to a single RB set, and hence, the PRBs within intra-cell guard band would not be used for PSFCH transmission. Using the intra-cell guard band could thus be prohibited or not allowed for PSFCH transmission.

Alternatively, or additionally, the intra-cell guard band 102 or 202, for example, can be used for PSFCH transmission only if the PSSCH/PSCCH transmission, the data and the control transmission, is over multiple RB sets (e.g., 104 and 106). Because in this way the PSFCH could be across the multiple RB sets as well.

In another aspect, whether the PSFCH transmission is on the intra-cell guard band can depend on a system configuration or the resource pool (pre)configuration. The process flow 1000 initiates at 1010 with determining to transmit a PSFCH transmission on the intra-cell guard band based on a resource pool (pre)configuration and a bitmap. the intra-cell guard band 102 or 202, for example, can be used for PSFCH transmission only if the PSSCH/PSCCH transmission, the data and the control transmission, is over multiple RB sets (e.g., 104 and 106). This can allow the PSFCH to be across the multiple RB sets as well. In an alternative or additional aspect, the PSFCH transmission can be restricted to a single RB set, and hence, the PRBs within intra-cell guard band would not be used and prohibited or not allowed for PSFCH transmission.

For example, an SL information element (IE) can be used such as the "sl-PSFCH-RB-Set" with a bitmap that can be extended to include the intra-cell guard band. So that each bit of the bitmap that is a one (or zero) means that this PRB is used for the PSFCH transmission, otherwise it is not used for the PSFCH transmission. If the bitmap indicates that these PRBs in intra-cell guard band could be used for the PSFCH transmission, or belonging to a PSFCH resource, then various designs could be configured.

If the each PSFCH transmission can occupy a common interlace and a zero or one or more dedicated PRBs, then at 1020 the process flow 1000 can include the PRBs in intra-cell guard band 102, 202 being configured for the PSFCH transmission according to the common interlace only (i.e., not as dedicated PRBs), or both the common interlace and the one or more dedicated PRBs. The dedicated PRBs are used for the transmission of the ACK/NACK information and the common interlace is used mainly to meet OCB requirements for the PSFCH transmission.

Alternatively, or additionally, at 1030 the process flow 1000 can comprise the PRBs in the intra-cell guard band being configured for the PSFCH transmission according to the common PRBs (i.e., not as dedicated PRBs) when the PSFCH transmission is occupying the dedicated PRBs and common PRBs. The common PRB is mainly to achieve the OCB requirements for the PSFCH transmission. Alternatively, the PSFCH transmission can be configured based on both the dedicated PRBs and the common PRBs when the PSFCH transmission is occupying the dedicated PRBs and common PRBs, which may be configured to ensure that the dedicated PRBs could also be included in the intra-cell guard band, for example.

Figure 11:
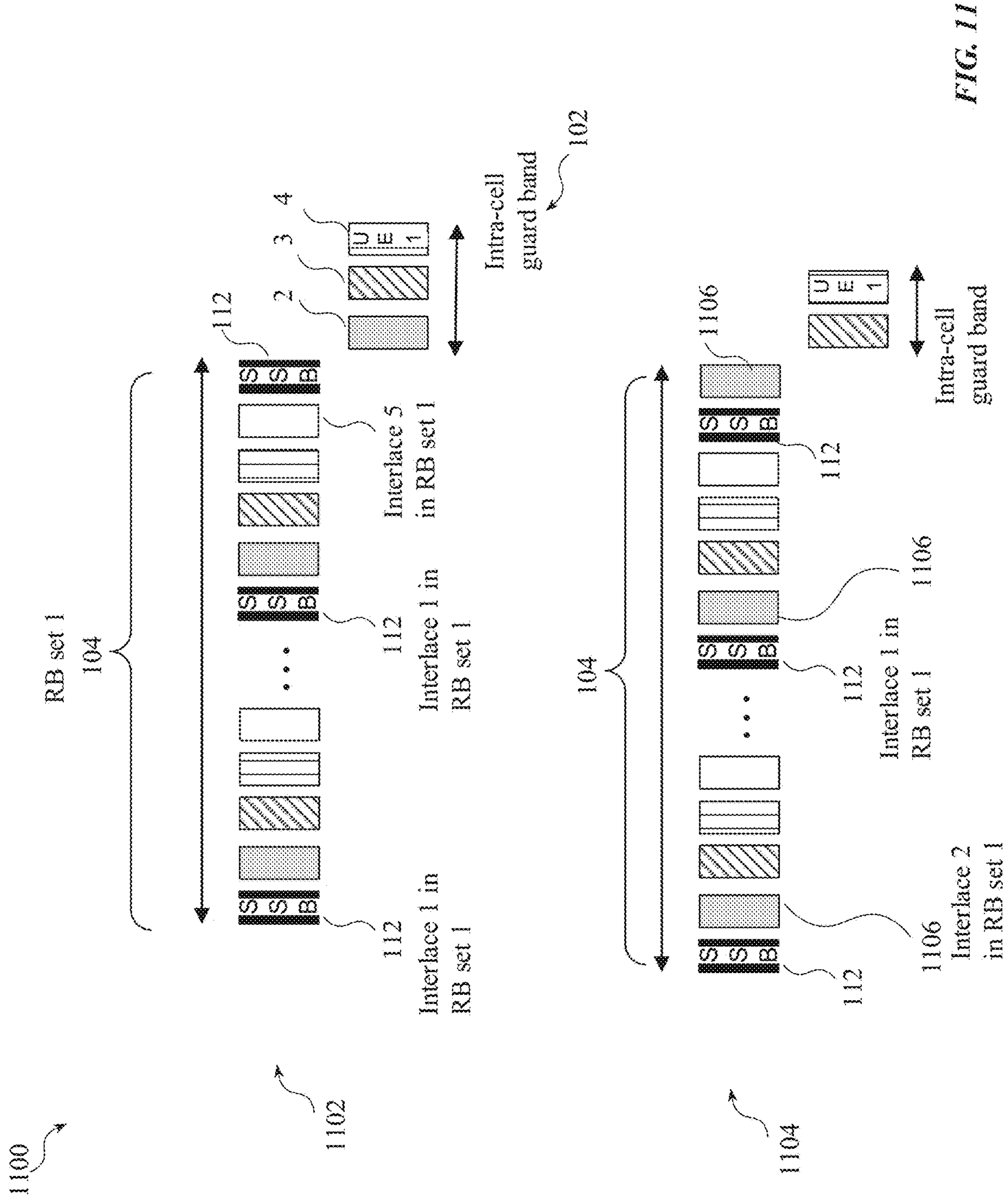
FIG. 11 illustrates an example system with SL communication including an SL synchronization signal block (S-SSB) configuration in accordance with various aspects discussed herein.

FIG. 11 is an example of S-SSB transmission on an intra-cell guard band. The intra-cell guard band 102, 202 can be used for S-SSB transmissions when an interlaced RB transmission is configured for S-PSS/S-SSS/PSBCH, which the S-SSB comprises. For the legacy design in SL, the SL SSB has 11 PRBs. Thus, the interlace for S-SSB transmission can only be an interlace that has 11 PRBs (from among 51 PRBs) associated with the interlace or interlace index. For the legacy design in SL, the SL SSB has 11 PRBs. Because only one interlace (interlace 1 with reference numeral 112) in the example RB sets for SL transmission has 11 PRBs that belongs to it in the RB set 104, then interlace 112 would be used for the S-SSB transmission since the others would not be suitable for S-SSB transmission.

If as in the previous aspects, PRBs to be used for the S-SSB transmission are extended to the intra-cell guard band. Then each of the interlaces in the intra-cell guard band 102 can be associated with the normal PRBs in the RB set 104 giving each of interlace 1, 2, 3, 4 has 11 PRBs while interlace 5 only has 10 as in a normal RB set while the others aside from interlace 1 have an additional PRB in the intra-cell guard band. Here, interlace 5 would not be suitable for the S-SSB transmission.

In the example RB set at SL transmission configuration 1104 for SL transmission, two interlaces have 11 PRBs, namely the interlace 1 with reference numeral 112 and interlace 2 with reference numeral 1106. Here, regardless of whether the intra-cell guard band is used or not multiple PRBs could be used for the S-SSB transmission.

In an aspect, the lowest interlace index among the interlaces with 11 PRBs could be used for the S-SSB transmission (e.g., interlace 1 with reference numeral 112). In another aspect, the highest interlace index among the interlaces counted with 11 PRBs could be used for the S-SSB transmission (e.g., interlace 4 among SL transmission configuration 1102 or interlace 2 with the reference numeral 1106 at SL transmission configuration 1104).

Alternatively, or additionally, an IE "SL-SyncConfig" can indicate which interlace is used for S-SSB transmissions in a RB set. It may additionally indicate which RB set is used for S-SSB transmissions if a resource pool is composed of multiple RB sets. Alternatively, the intra-cell guard band could not be allowed for S-SSB transmission and then the intra-cell guard band would not be counted or used for the S-SSB transmission.

Figure 12:
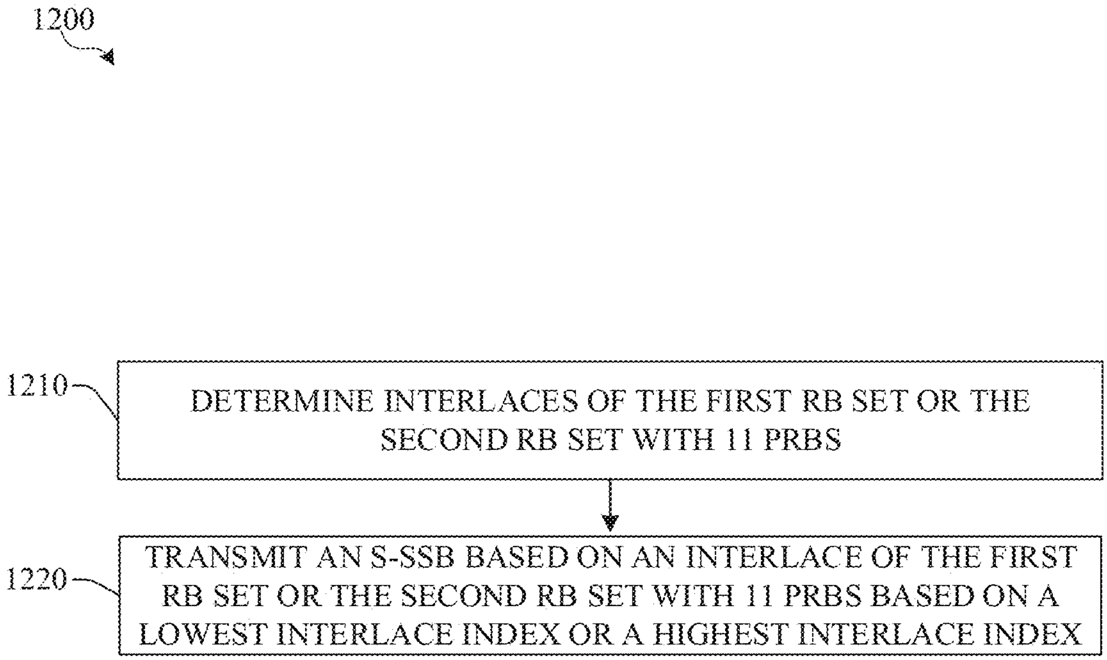
FIG. 12 illustrates an example process flow of SL communication for S-SSB transmission according to various aspects.

FIG. 12 illustrates an example process flow 1200 for S-SSB transmission on the intra-cell guard band. The process flow 1200 initiates at 1210 with determining whether interlaces of the first RB set or the second RB set with 11 PRBs, either including the intra-cell guard band or not. At 1220, the process flow 1200 includes transmitting an S-SSB based on an interlace of the first RB set or the second RB set with 11 PRBs, based on a lowest interlace index or a highest interlace index. An information element (e.g., SL-SyncConfig) can indicate whether to use the lowest interlace index or the highest interlace index, as well as indicate which RB set to use or associated with the intra-cell guard band from among the first RB set or the second RB set when a resource pool comprises multiple RB sets.

Figure 13:
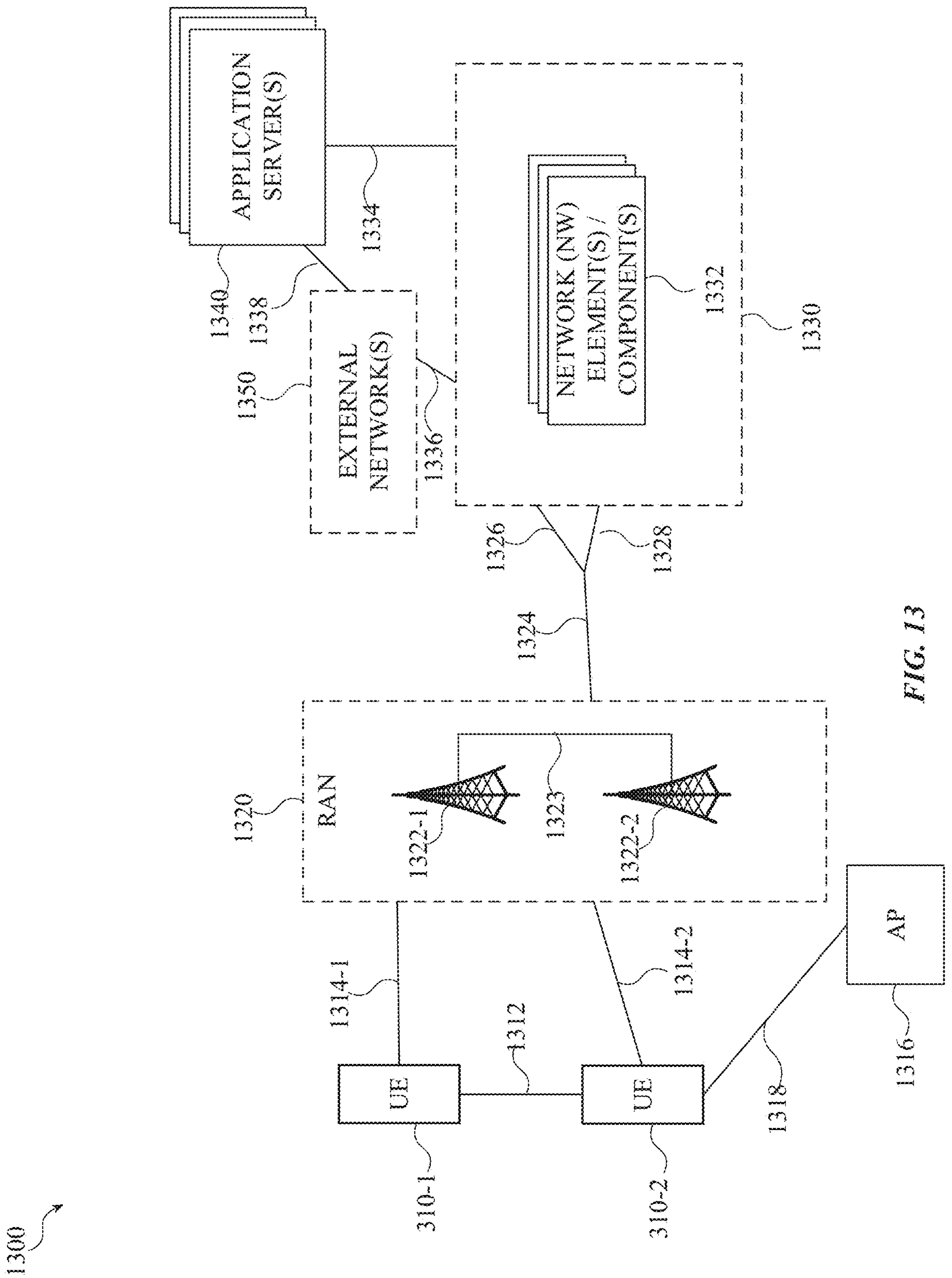
FIG. 13 illustrates an exemplary block diagram illustrating an example of UEs communicatively coupled a network with network components as peer devices useable in connection with various embodiments (aspects) described herein.

FIG. 13 is an example network 1300 according to one or more implementations described herein. Example network 1300 can include UEs 310-1, 310-2, etc. (referred to collectively as "UEs 310" and individually as "UE 310"), a radio access network (RAN) 1320, a core network (CN) 1330, application servers 1340, or external networks 1350.

The systems and devices of example network 1300 can operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 1300 can operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 310 can include smartphones (e.g., handheld touchscreen mobile computing devices connectable to one or more wireless communication networks). Additionally, or alternatively, UEs 310 can include other types of mobile or non-mobile computing devices capable of wireless communications, such as personal data assistants (PDAs), pagers, laptop computers, desktop computers, wireless handsets, etc. In some implementations, UEs 310 can include internet of things (IoT) devices (or IoT UEs) that can comprise a network access layer designed for low-power IoT applications utilizing short-lived UE connections. Additionally, or alternatively, an IoT UE can utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Additionally, UEs 310 can be NTN UEs that are capable of being communicatively coupled to satellites in an NTN network.

UEs 310 can communicate and establish a connection with (be communicatively coupled to) RAN 1320, which can involve one or more wireless channels 1314-1 and 1314-2, each of which can comprise a physical communications interface/layer. In some implementations, a UE can be configured with dual connectivity (DC) as a multi-radio access technology (multi-RAT) or multi-radio dual connectivity (MR-DC), where a multiple receive and transmit (Rx/Tx) capable UE can use resources provided by different network nodes (e.g., 1322-1 and 1322-2) that can be connected via non-ideal backhaul (e.g., where one network node provides NR access and the other network node provides either E-UTRA for LTE or NR access for 5G). In such a scenario, one network node can operate as a master node (MN) and the other as the secondary node (SN). The MN and SN can be connected via a network interface, and at least the MN can be connected to the CN 1330. Additionally, at least one of the MN or the SN can be operated with shared spectrum channel access, and functions specified for UE 310 can be used for an integrated access and backhaul mobile termination (IAB-MT). Similar for UE 310, the IAB-MT can access the network using either one network node or using two different nodes with enhanced dual connectivity (EN-DC) architectures, new radio dual connectivity (NR-DC) architectures, or other direct connectivity such as a sidelink (SL) communication channel as an SL interface 1312.

In some implementations, a base station (as described herein) can be an example of network node 1322. As shown, UE 310 can additionally, or alternatively, connect to access point (AP) 1316 via connection interface 1318, which can include an air interface enabling UE 310 to communicatively couple with AP 1316. AP 1316 can comprise a wireless local area network (WLAN), WLAN node, WLAN termination point, etc. The connection 1318 can comprise a local wireless connection, such as a connection consistent with any IEEE 702.11 protocol, and AP 1316 can comprise a wireless fidelity (Wi-Fi®) router or other AP. AP 1316 could be also connected to another network (e.g., the Internet) without connecting to RAN 1320 or CN 1330.

RAN 1320 can also include one or more RAN nodes 1322-1 and 1322-2 (referred to collectively as RAN nodes 1322, and individually as RAN node 1322) that enable channels 1314-1 and 1314-2 to be established between UEs 310 and RAN 1320. RAN nodes 1322 can include network access points configured to provide radio baseband functions for data or voice connectivity between users and the network based on one or more of the communication technologies described herein (e.g., 2G, 3G, 4G, 5G, WiFi, etc.). As examples therefore, a RAN node can be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 1322 can include a roadside unit (RSU), a transmission reception point (TRxP or TRP), and one or more other types of ground stations (e.g., terrestrial access points). In some scenarios, RAN node 1322 can be a dedicated physical device, such as a macrocell base station, or a low power (LP) base station for providing femtocells, picocells or other like having smaller coverage areas, smaller user capacity, or higher bandwidth compared to macrocells.

Some or all of RAN nodes 1322 can be implemented as one or more software entities running on server computers as part of a virtual network, which can be referred to as a centralized RAN (CRAN) or a virtual baseband unit pool (vBBUP). In these implementations, the CRAN or vBBUP can implement a RAN function split, such as a packet data convergence protocol (PDCP) split wherein radio resource control (RRC) and PDCP layers can be operated by the CRAN/vBBUP and other Layer 2 (L2) protocol entities can be operated by individual RAN nodes 1322; a media access control (MAC)/physical (PHY) layer split wherein RRC, PDCP, radio link control (RLC), and MAC layers can be operated by the CRAN/vBBUP and the PHY layer can be operated by individual RAN nodes 1322; or a "lower PHY" split wherein RRC, PDCP, RLC, MAC layers and upper portions of the PHY layer can be operated by the CRAN/vBBUP and lower portions of the PHY layer can be operated by individual RAN nodes 1322. This virtualized framework can allow freed-up processor cores of RAN nodes 1322 to perform or execute other virtualized applications.

In some implementations, an individual RAN node 1322 can represent individual gNB-distributed units (DUs) connected to a gNB-control unit (CU) via individual F1 interfaces. In such implementations, the gNB-DUs can include one or more remote radio heads or radio frequency (RF) front end modules (RFEMs), and the gNB-CU can be operated by a server (not shown) located in RAN 1320 or by a server pool (e.g., a group of servers configured to share resources) in a similar manner as the CRAN/vBBUP. Additionally, or alternatively, one or more of RAN nodes 1322 can be next generation eNBs (i.e., gNBs) that can provide evolved universal terrestrial radio access (E-UTRA) user plane and control plane protocol terminations toward UEs 310, and that can be connected to a 5G core network (5GC) 1330 via an NG interface.

Any of the RAN nodes 1322 can terminate an air interface protocol and can be the first point of contact for UEs 310. In some implementations, any of the RAN nodes 1322 can fulfill various logical functions for the RAN 1320 including, but not limited to, radio network controller (RNC) functions such as radio bearer management, uplink and downlink dynamic radio resource management and data packet scheduling, and mobility management. UEs 310 can be configured to communicate using orthogonal frequency-division multiplexing (OFDM) communication signals with each other or with any of the RAN nodes 1322 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations can not be limited in this regard. The OFDM signals can comprise a plurality of orthogonal subcarriers.

Further, RAN nodes 1322 can be configured to wirelessly communicate with UEs 310, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum can include channels that operate in a frequency range (e.g., approximately 400 MHz to approximately 3.8 GHz, or other range). In some regions, the unlicensed spectrum can include about the 5 GHz band, for example, or other frequency bands. A licensed spectrum can correspond to channels or frequency bands selected, reserved, regulated, etc., for certain types of wireless activity (e.g., wireless telecommunication network activity), whereas an unlicensed spectrum can correspond to one or more frequency bands that are not restricted for certain types of wireless activity. Whether a particular frequency band corresponds to a licensed medium or an unlicensed medium can depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 310 and the RAN nodes 1322 can operate using licensed assisted access (LAA), eLAA, and/or feLAA mechanisms. In these implementations, UEs 310 and the RAN nodes 1322 can perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol or a clear channel assessment (CCA).

A physical downlink shared channel (PDSCH) can carry user data and higher layer signaling to UEs 310. The physical downlink control channel (PDCCH) can carry information about the transport format and resource allocations related to the PDSCH channel, among other things. The PDCCH can also inform UEs 310 about the transport format, resource allocation, and hybrid automatic repeat request (HARQ) information related to the uplink shared channel. Typically, downlink scheduling (e.g., assigning control and shared channel resource blocks to UE 310-2 within a cell) can be performed at any of the RAN nodes 1322 based on channel quality information fed back from any of UEs 310. The downlink resource assignment information can be sent on the PDCCH used for (e.g., assigned to) each of UEs 310.

The PDCCH uses control channel elements (CCEs) to convey the control information, wherein a number of CCEs (e.g., 6 or the like) can consists of a resource element groups (REGs), where a REG is defined as a physical resource block (PRB) in an OFDM symbol. Before being mapped to resource elements, the PDCCH complex-valued symbols can first be organized into quadruplets, which can then be permuted using a sub-block interleaver for rate matching, for example. Each PDCCH can be transmitted using one or more of these CCEs, where each CCE can correspond to nine sets of four physical resource elements known as REGs. Four quadrature phase shift keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, 8, or 16).

The RAN nodes 1322 or RAN 1320 can be configured to communicate with one another via interface 1323. In implementations where the system is an LTE system, interface 1324 can be an X2 interface. The X2 interface can be defined between two or more RAN nodes 1322 (e.g., two or more eNBs/gNBs or a combination thereof) that connect to evolved packet core (EPC) or CN 1330, or between two eNBs connecting to an EPC. In some implementations, the X2 interface can include an X2 user plane interface (X2-U) 1326 and an X2 control plane interface (X2-C) 1328. The X2-U can provide flow control mechanisms for user data packets transferred over the X2 interface and can be used to communicate information about the delivery of user data between eNBs or gNBs. For example, the X2-U can provide specific sequence number information for user data transferred from a master eNB (MeNB) to a secondary eNB (SeNB); information about successful in sequence delivery of PDCP packet data units (PDUs) to a UE 310 from an SeNB for user data; information of PDCP PDUs that were not delivered to a UE 310; information about a current minimum desired buffer size at the SeNB for transmitting to the UE user data; and the like. The X2-C can provide intra-LTE access mobility functionality (e.g., including context transfers from source to target eNBs, user plane transport control, etc.), load management functionality, and inter-cell interference coordination functionality.

Alternatively, or additionally, RAN 1320 can be also connected (e.g., communicatively coupled) to CN 1330 via a Next Generation (NG) interface as interface 1324. The NG interface 1324 can be split into two parts, a Next Generation (NG) user plane (NG-U) interface 1326, which carries traffic data between the RAN nodes 1322 and a User Plane Function (UPF), and the S1 control plane (NG-C) interface

1328, which is a signaling interface between the RAN nodes 1322 and Access and Mobility Management Functions (AMFs).

CN 1330 can comprise a plurality of network elements 1332, which are configured to offer various data and telecommunications services to customers/subscribers (e.g., users of UEs 310) who are connected to the CN 1330 via the RAN 1320. In some implementations, CN 1330 can include an evolved packet core (EPC), a 5G CN, and/or one or more additional or alternative types of CNs. The components of the CN 1330 can be implemented in one physical node or separate physical nodes including components to read and execute instructions from a machine-readable or computer-readable medium (e.g., a non-transitory machine-readable storage medium).

As shown, CN 1330, application servers 1340, and external networks 1350 can be connected to one another via interfaces 1334, 1336, and 1338, which can include IP network interfaces. Application servers 13340 can include one or more server devices or network elements (e.g., virtual network functions (VNFs) offering applications that use IP bearer resources with CN 1330 (e.g., universal mobile telecommunications system packet services (UMTS PS) domain, LTE PS data services, etc.). Application servers 13340 can also, or alternatively, be configured to support one or more communication services (e.g., voice over IP (VoIP sessions, push-to-talk (PTT) sessions, group communication sessions, social networking services, etc.) for UEs 310 via the CN 1330. Similarly, external networks 1350 can include one or more of a variety of networks, including the Internet, thereby providing the mobile communication network and UEs 310 of the network access to a variety of additional services, information, interconnectivity, and other network features.

Various aspects herein can include the UE 310-1 communicating in SL communication over the SL interface 1312 (or channel) with peer UE 310-2, for example. In an aspect, UE 310-1 can communicate in SL communication to UE 310-2 over SL interface 1312. Processing circuitry of the UE 310-1 can execute instructions to cause the UE to generate an SL transmission (e.g., in an NR unlicensed band), wherein PRBs in the intra-cell guard band between adjacent RB sets are based on an association of the PRBs with a first RB set or with a second RB set. The UE 310-1 can then transmit the S-SSB transmission in an SL channel of the unlicensed band.

The UE 310-1 or 310-2 is configured to process, perform, generate, communicate or cause execution of any one or more combined aspects described herein or in association with FIG. 1 thru FIG. 13.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment, aspect or example provided within this disclosure and can be applied to any of the systems/devices/components disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure is described with reference to attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is a User Equipment (UE) comprising: a memory; and processing circuitry, coupled to the memory, configured to, when executing instructions stored in the memory, cause the UE to: transmit a sidelink (SL) transmission comprising a first resource block (RB) set and a second RB set of at least two adjacent RB sets with an intra-cell guard band between the at least two adjacent RB sets; and wherein physical resource blocks (PRBs) in the intra-cell guard band are configured for the SL transmission based on an association with the first RB set or with the second RB set.

A second example can include the first example, wherein PRBs of the intra-cell guard band belong to the first RB set with a lower frequency than the intra-cell guard band, or the PRBs of the intra-cell guard band belong to the second RB set with a higher frequency than the intra-cell guard band.

A third example can include the first or second example, wherein the processing circuitry is further configured to: associate the PRBs in the intra-cell guard band to an interlace indexing of the first RB set by counting interlaces in the intra-cell guard band consecutively from the PRBs of the first RB set, or backwards from an end of the second RB set, based on a resource pool (pre)configuration.

A fourth example can include any one or more of the first through third examples, wherein the processing circuitry is further configured to: index the PRBs of the intra-cell guard band between the first RB set and the second RB according to the association with the first RB set or with the second RB set based on a resource pool (pre)configuration or a (pre) defined determination.

A fifth example can include any one or more of the first through fourth examples, wherein the processing circuitry is further configured to: perform physical SL shared channel (PSSCH) mapping of PRBs on the intra-cell guard band by rate matching a portion of bits associated with SL control information (SCI) stage 2 and another portion of bits associated with SL data on the intra-cell guard band, or rate matching the portion of bits associated with the SL data only on the intra-cell guard band.

A sixth example can include any one or more of the first through fifth examples, wherein the processing circuitry is further configured to: perform PSSCH mapping of PRBs on the intra-cell guard band by repeating a portion of mapped bits associated with SCI stage 2 and SL data of the first RB set or the second RB set on a corresponding interlace in the intra-cell guard band.

A seventh example can include any one or more of the first through sixth examples, wherein the portion of mapped bits comprises bits corresponding to a first PRB, or a last PRB, among PRBs with mapped bits, of the first RB set or the second RB set of the association.

An eighth example can include any one or more of the first through seventh examples, wherein the processing circuitry is further configured to: determine a sidelink transport block size (SL TBS) for an initial data transmission or a data re-transmission with a number of PRBs per interlace based on a pre-defined number or a pre-defined indication to include PRBs in the intra-cell guard band, based on (pre)-configuration of either a resource pool or a sidelink bandwidth (BWP), or based on a dynamic indication of a stage one SCI or a stage two SCI, wherein the number of PRBs comprises 10 PRBs or 11 PRBs.

A ninth example can include any one or more of the first through eighth examples, wherein the processing circuitry is further configured to: determine to transmit a physical sidelink feedback channel (PSFCH) transmission on the intra-cell guard band based on a resource pool (pre)configuration, a prohibition, or in response to a PSSCH/physical SL control channel (PSCCH) spanning a plurality of RB sets in an unlicensed spectrum.

A tenth example can include any one or more of the first through ninth examples, wherein determining to transmit the PSFCH transmission on the intra-cell guard band is further based on the resource pool (pre)configuration and a bitmap indicating PRBs in the intra-cell guard band belonging to a PSFCH resource, wherein in response to the PSFCH transmission occupying a common interlace, and a zero or one or more dedicated PRBs, the PRBs in intra-cell guard band are configured for the PSFCH transmission according to the common interlace only, or both the common interlace and the one or more dedicated PRBs, and wherein in response to the PSFCH transmission occupying the dedicated PRBs and common PRBs, the PRBs in the intra-cell guard band are configured for the PSFCH transmission according to the common PRBs, or both the dedicated PRBs and the common PRBs.

An eleventh example can include any one or more of the first through tenth examples, wherein the processing circuitry is further configured to: transmit a sidelink synchronization signal block (S-SSB) based on interlaces of the first RB set or the second RB set with 11 PRBs, and on a lowest interlace index or a highest interlace index.

An twelfth example can include any one or more of the first through tenth examples, wherein an information element indicates whether to use the lowest interlace index or the highest interlace index, and which RB set to use from among the first RB set or the second RB set when a resource pool comprises multiple RB sets.

A thirteenth example can be a method comprising: transmitting, via a user equipment (UE), a sidelink (SL) transmission in an unlicensed band comprising a first resource block (RB) set and a second RB set that is adjacent to the first RB set with an intra-cell guard band between the first RB set and the second RB set, wherein physical resource blocks (PRBs) in the intra-cell guard band are configured for the SL transmission based on an association with the first RB set or with the second RB set.

A fourteenth example can include the thirteenth example, wherein the PRBs are generated in the intra-cell guard band based on the association being to the first RB set, the first RB set comprising a frequency that is lower than the intra-cell guard band, wherein an interlace indexing of the PRBs in the intra-cell guard band continues sequentially from the first RB set.

A fifteenth example can include any one or more of the thirteenth through the fourteenth examples, wherein the PRBs are generated in the intra-cell guard band based on the association being to the second RB set, the second RB set comprising a frequency that is higher than the intra-cell guard band, wherein an interlace indexing of the PRBs in the intra-cell guard band is extended in reverse from a last PRB or a last PRB cycle of interlaces in the second RB set.

A sixteenth example can include any one or more of the thirteenth through the fifteenth examples, further comprising: mapping physical SL shared channel (PSSCH) PRBs on the intra-cell guard band by rate matching a portion of bits associated with SL control information (SCI) stage 2 and with SL data, or only the SL data, on the intra-cell guard band, or by repetition of a same portion of bits on the first RB set or the second RB set associated with the SCI stage 2 and the SL data.

A seventeenth example can include any one or more of the thirteenth through the sixteenth examples, further comprising: determining a sidelink transport block size (SL TBS) for an initial data transmission and a data re-transmission with a number of PRBs per interlace based on a pre-defined indication to include PRBs in the intra-cell guard band or a pre-defined number, based on a (pre)configuration of either a resource pool (or a sidelink bandwidth part (BWP), or based on a dynamic indication of a stage one SCI or a stage two SCI.

An eighteenth example can include any one or more of the thirteenth through the seventeenth examples, further comprising: transmitting a physical sidelink feedback channel (PSFCH) transmission on the intra-cell guard band based on a resource pool (pre)configuration, a prohibition, or in response to a PSSCH/physical SL control channel (PSCCH) spanning a plurality of RB sets in an unlicensed spectrum.

A nineteenth example can includes any one or more of thirteenth through eighteenth examples, further comprising: transmitting a sidelink synchronization signal block (S-SSB) based on interlaces of the first RB set or the second RB set with 11 PRBs and a lowest interlace index or a highest interlace index, or based on an information element that indicates whether to use the lowest interlace index or the highest interlace index and which RB set to use from among the first RB set or the second RB set when a resource pool comprises multiple RB sets.

A twentieth example can be a baseband processor comprising: a memory; and processing circuitry, communicatively coupled to the memory, configured to, when executing instructions stored in the memory, cause the baseband processor to: generate a sidelink (SL) transmission in an unlicensed band comprising a first resource block (RB) set and a second RB set that is adjacent to the first RB set with an intra-cell guard band between the first RB set and the second RB set, wherein physical resource blocks (PRBs) in the intra-cell guard band are configured for the SL transmission based on an association of the PRBs with the first RB set or with the second RB set.

A twenty-first example can include the twentieth example, wherein PRBs of the intra-cell guard band belong to the first RB set comprising a frequency that is lower than the intra-cell guard band, and the second RB set comprises a frequency that is higher than the intra-cell guard band.

A twenty-second example can include any one or more of the twentieth through twenty-first examples, wherein the processing circuitry is further configured to: determine a sidelink transport block size (SL TBS) for an initial data transmission and a data re-transmission with a number of PRBs per interlace based on being pre-defined, a resource pool (pre)configuration, or a dynamic indication in a stage one sidelink (SL) control information (SCI), wherein the SL TBS is determined without counting an intra-cell guard band number of PRBs, or based on one or more indications of whether and how many of the intra-cell guard band number of PRBs from a resource pool (pre)configuration.

A twenty-third example can include one or more of the twentieth through twenty-second examples, wherein the processing circuitry is further configured to: determine a sidelink transport block size (SL TBS) for an initial data transmission or a data re-transmission with a number of PRBs per interlace based on a (pre)configuration of a resource pool or a sidelink bandwidth part (BWP), wherein the number of PRBs comprises 10 PRBs or 11 PRBs.

Moreover, various aspects or features described herein can be implemented as a method, apparatus, or article of manufacture using standard programming and/or engineering techniques. The term “article of manufacture” as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term “machine-readable medium” can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A User Equipment (UE) comprising:

a memory; and processing circuitry, coupled to the memory, configured to, when executing instructions stored in the memory, cause the UE to:

transmit a sidelink (SL) transmission comprising a first resource block (RB) set and a second RB set of at least two adjacent RB sets with an intra-cell guard band between the at least two adjacent RB sets;

determine, from a higher layer parameter, a reference number of physical resource blocks (PRBs) per interlace within one RB set, wherein the higher layer parameter includes a first value corresponding to 10 PRBs and a second value corresponding to 11 PRBs; and determine a SL transport block size (TBS) for the SL transmission based on a total number of PRBs derived from the reference number of PRBs.

2. The UE of claim 1, wherein PRBs of the intra-cell guard band belong to the first RB set with a lower frequency than the intra-cell guard band, or the PRBs of the intra-cell guard band belong to the second RB set with a higher frequency than the intra-cell guard band.

3. The UE of claim 1, wherein the processing circuitry is further configured to:

associate PRBs in the intra-cell guard band to an interlace indexing of the first RB set by counting interlaces in the intra-cell guard band consecutively from the PRBs of the first RB set, or backwards from an end of the second RB set, based on a resource pool (pre)configuration.

4. The UE of claim 1, wherein the processing circuitry is further configured to:

index PRBs of the intra-cell guard band between the first RB set and the second RB set according to an association of the PRBs with the first RB set or with the second RB set, wherein the association is determined based on a resource pool (pre)configuration or a (pre) defined determination.

5. The UE of claim 1, wherein the processing circuitry is further configured to:

perform physical SL shared channel (PSSCH) mapping of PRBs on the intra-cell guard band by rate matching a portion of bits associated with SL control information (SCI) stage 2 and another portion of bits associated with SL data on the intra-cell guard band, or rate matching the portion of bits associated with the SL data only on the intra-cell guard band.

6. The UE of claim 1, wherein the processing circuitry is further configured to:

perform PSSCH mapping of PRBs on the intra-cell guard band by repeating a portion of mapped bits associated with SCI stage 2 and SL data of the first RB set or the second RB set on a corresponding interlace in the intra-cell guard band.

7. The UE of claim 6, wherein the portion of mapped bits comprises bits corresponding to a first PRB, or a last PRB, among PRBs with mapped bits in the first RB set or the second RB set.

8. The UE of claim 1, wherein the reference number of PRBs is based on a (pre)-configuration of either a resource pool or a sidelink bandwidth (BWP) and is unified for an initial data transmission and a data re-transmission of different numbers of interlaces.

9. The UE of claim 1, wherein the processing circuitry is further configured to:

determine to transmit a physical sidelink feedback channel (PSFCH) transmission on the intra-cell guard band based on a resource pool (pre)configuration, a prohibition, or in response to a PSSCH/physical SL control channel (PSCCH) spanning a plurality of RB sets in an unlicensed spectrum.

10. The UE of claim 9, wherein determining to transmit the PSFCH transmission on the intra-cell guard band is further based on the resource pool (pre)configuration and a bitmap indicating PRBs in the intra-cell guard band belonging to a PSFCH resource, wherein in response to the PSFCH transmission occupying a common interlace, and a zero or one or more dedicated PRBs, the PRBs in the intra-cell guard band are configured for the PSFCH transmission according to the common interlace only, or both the common interlace and the one or more dedicated PRBs, and wherein in response to the PSFCH transmission occupying the dedicated PRBs and common PRBs, the PRBs in the intra-cell guard band are configured for the PSFCH transmission according to the common PRBs, or both the dedicated PRBs and the common PRBs.

11. The UE of claim 1, wherein the processing circuitry is further configured to:

transmit a sidelink synchronization signal block (S-SSB) based on interlaces of the first RB set or the second RB set with 11 PRBs, and on a lowest interlace index or a highest interlace index.

12. The UE of claim 11, wherein an information element indicates whether to use the lowest interlace index or the highest interlace index, and which RB set to use from among the first RB set or the second RB set when a resource pool comprises multiple RB sets.

13. A method comprising:

transmitting, via a user equipment (UE), a sidelink (SL) transmission in an unlicensed band comprising a first resource block (RB) set and a second RB set that is adjacent to the first RB set with an intra-cell guard band between the first RB set and the second RB set;

receiving a higher layer parameter indicating a reference number of physical resource blocks (PRBs) per interlace within one RB set, wherein the higher layer parameter includes a first value corresponding to 10 PRBs and a second value corresponding to 11 PRBs;

determining a total number of PRBs based on the reference number of physical resource blocks (PRBs), a number of interlaces per subchannel, a number of occupied sub-channels within one RB set, and a number of occupied RB sets for the SL transmission; and determining a SL transport block size (TBS) for the SL transmission based on the total number of PRBs.

14. The method of claim 13, wherein PRBs are generated in the intra-cell guard band based on the PRBs in the intra-cell guard band corresponding to the first RB set, the first RB set comprising a frequency lower than the intra-cell guard band, wherein an interlace indexing of the PRBs in the intra-cell guard band continues sequentially from the first RB set.

15. The method of claim 13, wherein PRBs are generated in the intra-cell guard band based on the PRBs in the intra-cell guard band corresponding to the second RB set, the second RB set comprising a frequency higher than the intra-cell guard band, wherein an interlace indexing of the PRBs in the intra-cell guard band is extended in reverse from a last PRB or a last PRB cycle of interlaces in the second RB set.

16. The method of claim 13, further comprising:

mapping physical SL shared channel (PSSCH) PRBs on the intra-cell guard band by rate matching a portion of bits associated with SL control information (SCI) stage 2 and with SL data, or only the SL data, on the intra-cell guard band, or by repetition of a same portion of bits on the first RB set or the second RB set associated with the SCI stage 2 and the SL data.

17. The method of claim 13, wherein the reference number of PRBs is based on a (pre)configuration of either a resource pool or a sidelink bandwidth part (BWP).

18. The method of claim 13, further comprising:

transmitting a physical sidelink feedback channel (PSFCH) transmission on the intra-cell guard band based on a resource pool (pre)configuration, a prohibition, or in response to a PSSCH/physical SL control channel (PSCCH) spanning a plurality of RB sets in an unlicensed spectrum.

19. The method of claim 13, further comprising:

transmitting a sidelink synchronization signal block (S-SSB) based on interlaces of the first RB set or the second RB set with 11 PRBs and a lowest interlace index or a highest interlace index, or based on an information element that indicates whether to use the lowest interlace index or the highest interlace index and which RB set to use from among the first RB set or the second RB set when a resource pool comprises multiple RB sets.

20. A baseband processor comprising:

a memory; and processing circuitry, communicatively coupled to the memory, configured to, when executing instructions stored in the memory, cause the baseband processor to:

generate a sidelink (SL) transmission in an unlicensed band comprising a first resource block (RB) set and a second RB set that is adjacent to the first RB set with an intra-cell guard band between the first RB set and the second RB set, determine, from a higher layer parameter, a reference number of physical resource blocks (PRBs) per interlace within one RB set, wherein the higher layer parameter includes a first value corresponding to 10 PRBs and a second value corresponding to 11 PRBs;

determine a total number of PRBs based on the reference number of physical resource blocks (PRBs), a number of interlaces per subchannel, a number of occupied sub-channels within one RB set, and a number of occupied RB sets for the SL transmission; and determine a SL transport block size (TBS) for the SL transmission based on the total number of PRBs.

21. The baseband processor of claim 20, wherein PRBs of the intra-cell guard band belong to the first RB set comprising a frequency that is lower than the intra-cell guard band, and the second RB set comprises a frequency that is higher than the intra-cell guard band.

22. The baseband processor of claim 20, wherein the reference number of PRBs is based on a resource pool (pre)configuration.

* * * * *